(12) United States Patent
Carney

(10) Patent No.: US 10,794,439 B2
(45) Date of Patent: Oct. 6, 2020

(54) EMBOSSED BRAKE PAD

(71) Applicant: John Joseph Carney, Washington Crossing, PA (US)

(72) Inventor: John Joseph Carney, Washington Crossing, PA (US)

(*) Notice: Subject to any disclaimer, the term of this patent is extended or adjusted under 35 U.S.C. 154(b) by 134 days.

(21) Appl. No.: 14/916,544

(22) PCT Filed: Sep. 5, 2014

(86) PCT No.: PCT/US2014/054239
§ 371 (c)(1),
(2) Date: Mar. 3, 2016

(87) PCT Pub. No.: WO2015/035131
PCT Pub. Date: Mar. 12, 2015

(65) Prior Publication Data
US 2016/0195147 A1 Jul. 7, 2016

Related U.S. Application Data

(60) Provisional application No. 61/874,160, filed on Sep. 5, 2013.

(51) Int. Cl.
*F16D 65/00* (2006.01)
*F16D 65/092* (2006.01)
*F16D 69/00* (2006.01)

(52) U.S. Cl.
CPC ....... *F16D 65/0006* (2013.01); *F16D 65/092* (2013.01); *F16D 2069/004* (2013.01)

(58) Field of Classification Search
CPC ............ F16D 65/006; F16D 65/092; F16D 2069/004; F16D 65/04; F16D 69/04; F16D 2069/0441
See application file for complete search history.

(56) References Cited

U.S. PATENT DOCUMENTS 1,239,447 A * 9/1917 Armbrust .............. F16D 65/062
188/255
2,909,244 A * 10/1959 Kraft ................... B60G 17/052
188/29

(Continued)

FOREIGN PATENT DOCUMENTS

CA 2412921 A1 12/2002
DE 20011435 U1 1/2001

(Continued)

OTHER PUBLICATIONS

Advertisement for Akebono Brakes in Undercar Digest.

(Continued)

*Primary Examiner* — Melanie Torres Williams
(74) *Attorney, Agent, or Firm* — Paul & Paul

(57) ABSTRACT

The invention uses structural damping to reduce noise in brake pads in lieu of the traditional method of isolation of the noise by application of a vibration insulator. The invention eliminates the problems and costs associated with applying insulators to the brake pads. The invention geometrically alters the friction back plate to move frequencies away from the resonant frequencies, increase scattering and enhance absorption. Attenuation is greater in back plates made with the invention techniques. The geometry can be changed by machining or embossing. The benefits are substantial in that the invention will reduce costs, reduce weight, reduce noise and increase wearing thickness.

5 Claims, 35 Drawing Sheets

(56) References Cited

U.S. PATENT DOCUMENTS

| | | | |
|---|---|---|---|
| 4,036,333 A * | 7/1977 | Mathauser | B62L 1/005 188/264 A |
| 5,285,873 A | 2/1994 | Arbesman | |
| 5,355,986 A * | 10/1994 | Biswas | F16D 69/0408 188/258 |
| 5,429,216 A * | 7/1995 | Kahr | F16D 65/092 188/250 E |
| 5,515,950 A | 5/1996 | Kwolek | |
| 6,170,620 B1 | 1/2001 | Akita et al. | |
| 6,367,600 B1 * | 4/2002 | Arbesman | B21D 28/10 188/250 B |
| 6,913,120 B2 | 7/2005 | Bosco et al. | |
| 7,802,478 B2 | 9/2010 | Dill et al. | |
| 2002/0023810 A1 | 2/2002 | Hasegawa | |
| 2004/0099493 A1 | 5/2004 | Himmelsbach et al. | |
| 2004/0134725 A1 | 7/2004 | Bosco et al. | |
| 2004/0163903 A1 * | 8/2004 | Saka | F16D 65/0006 188/250 G |
| 2004/0226787 A1 | 11/2004 | Baba | |
| 2004/0238297 A1 | 12/2004 | Brecht et al. | |
| 2008/0156601 A1 | 7/2008 | Himmelsbach et al. | |
| 2011/0198170 A1 | 8/2011 | Turani et al. | |
| 2011/0220441 A1 * | 9/2011 | Zhang | F16D 65/092 188/250 B |
| 2012/0160616 A1 | 6/2012 | Passalacqua et al. | |

FOREIGN PATENT DOCUMENTS

| | | | | |
|---|---|---|---|---|
| DE | 202006021094 U1 * | 7/2012 | | F16D 65/092 |
| EP | 1752675 A2 * | 2/2007 | | F16D 65/092 |
| JP | H1163042 A | 3/1999 | | |
| JP | 2009097600 A | 5/2009 | | |
| JP | 6112391 B2 * | 4/2017 | | F16D 65/0006 |
| WO | WO-2005003584 A1 * | 1/2005 | | F16D 65/092 |
| WO | 2011033395 A1 | 3/2011 | | |

OTHER PUBLICATIONS

NUCAP i2 Nu Lok vs. Baseline vs. MSC Brake Dynamometer Test Reports, Comparative Test Summary Results, Link Test # 50614, 50613, 50612-1, SAE J2521 Standard Test, by NUCAP.

NUCAP, Sound Technology, Problem Applications, Shim Solutions Series, product brochure by NUCAP.

NUCAP, Sound Technology from NUCAP, Mechanically Attached Shim Product Line, product brochure by NUCAP.

DC Shims with Chemlon® Coating, product brochure.

NUCAP, Non-Stick, High Heat colored Multi-Layer Shim Products, DC Shim™ Products Line, product brochure by NUCAP.

NUCAP, Sound Technology, Mechanically Attached Shim Product Line, product brochure by NUCAP.

Joyyoung Brake, product brochure by Joyyoung.

Densification, Microstructure, and Mechanical Properties of Zirconium Diboride Based Ultra-High Temperature Ceramics, by Sumin Zhu, A Dissertation Presented to the Faculty of the Graduate School of the Missouri University of Science and Technology in Partial Fulfillment of the Requirements for the Degree Doctor of Philosophy in Ceramic Engineering, 2008.

Web pages from http://www.nucap.com/products/backing-plates/nrs/, NUCAP, accessed Aug. 5, 2013.

Web pages from http://aftermarket.federalmogul.com/en-US/Brands/Wagner-Brake/Pages . . . , Federal Mogul, accessed Aug. 5, 2013.

Brake Dynamometer Test Report, prepared for Gerry Roy of NUCAP Industries, 3370 Pharmacy Avenue, Toronto, Ontario, M1W 3K4, Canada, LINK Testing Laboratories Inc., 13840 Elmira Ave., Detroit, MI 48227, Link Test #: 051652, May 13, 2005.

Brake Dynamometer Test Report, prepared for Gerry Roy of NUCAP Industries, 3370 Pharmacy Avenue, Toronto, Ontario, M1W 3K4, Canada, LINK Testing Laboratories Inc., 13840 Elmira Ave., Detroit, MI 48227, Link Test #: 051653, May 13, 2005.

* cited by examiner

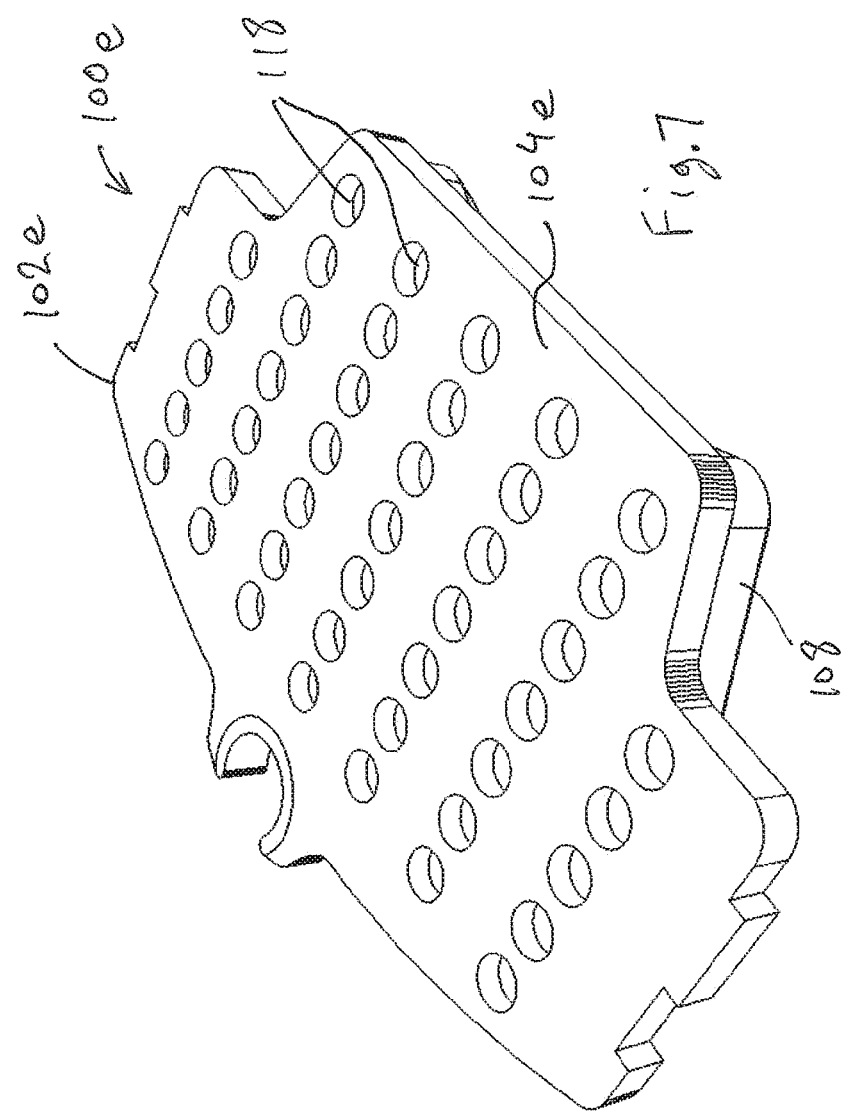

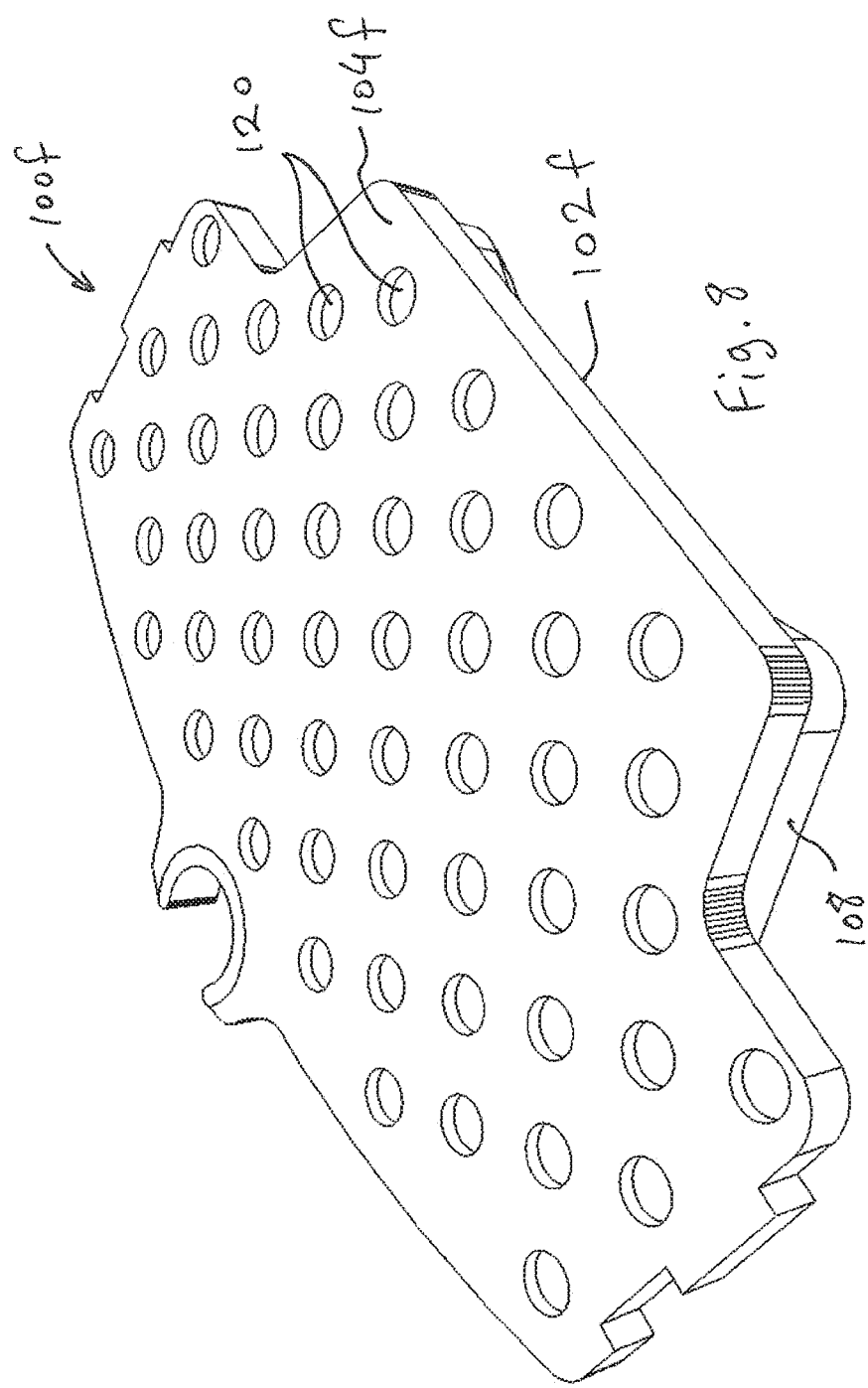

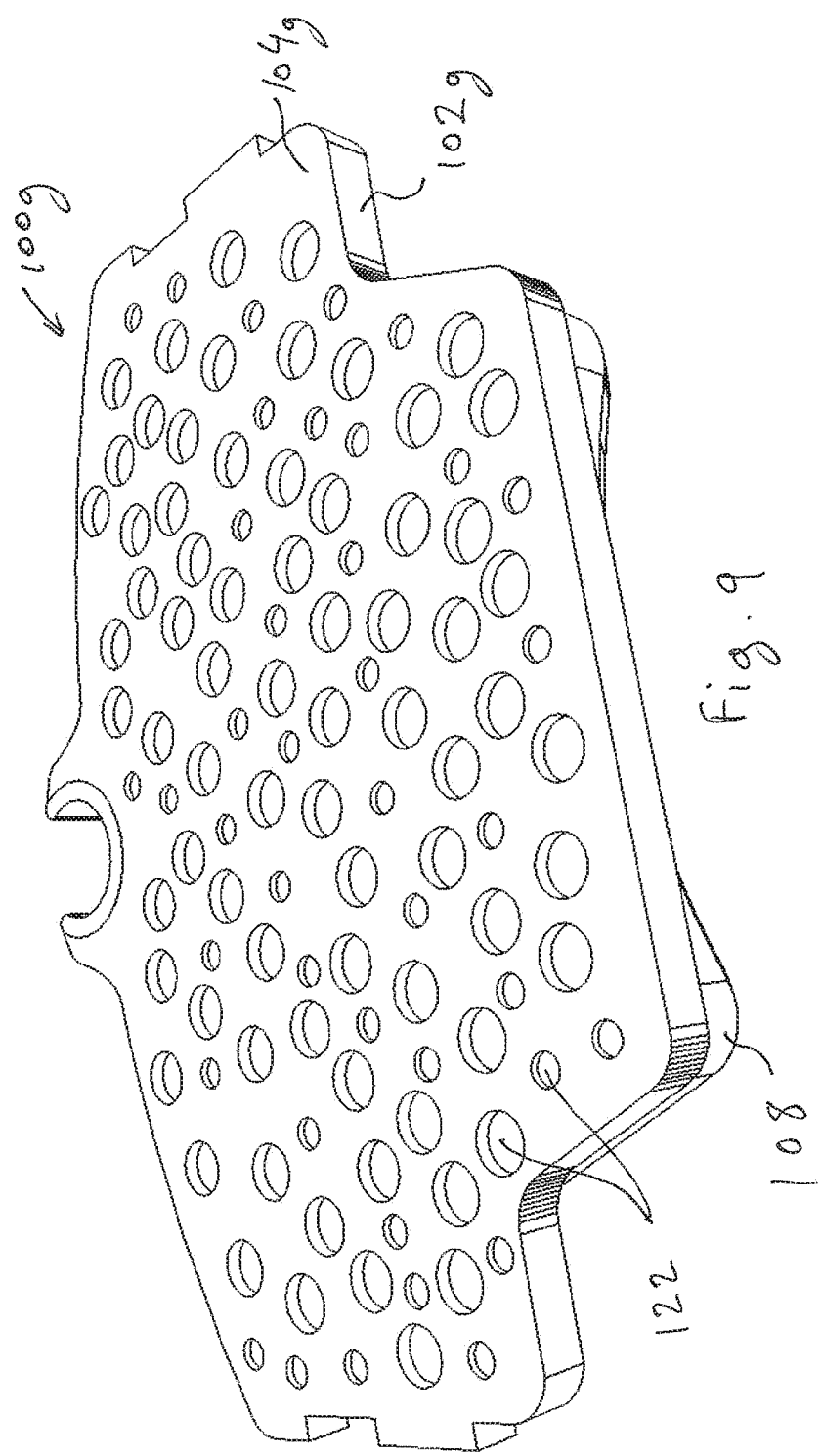

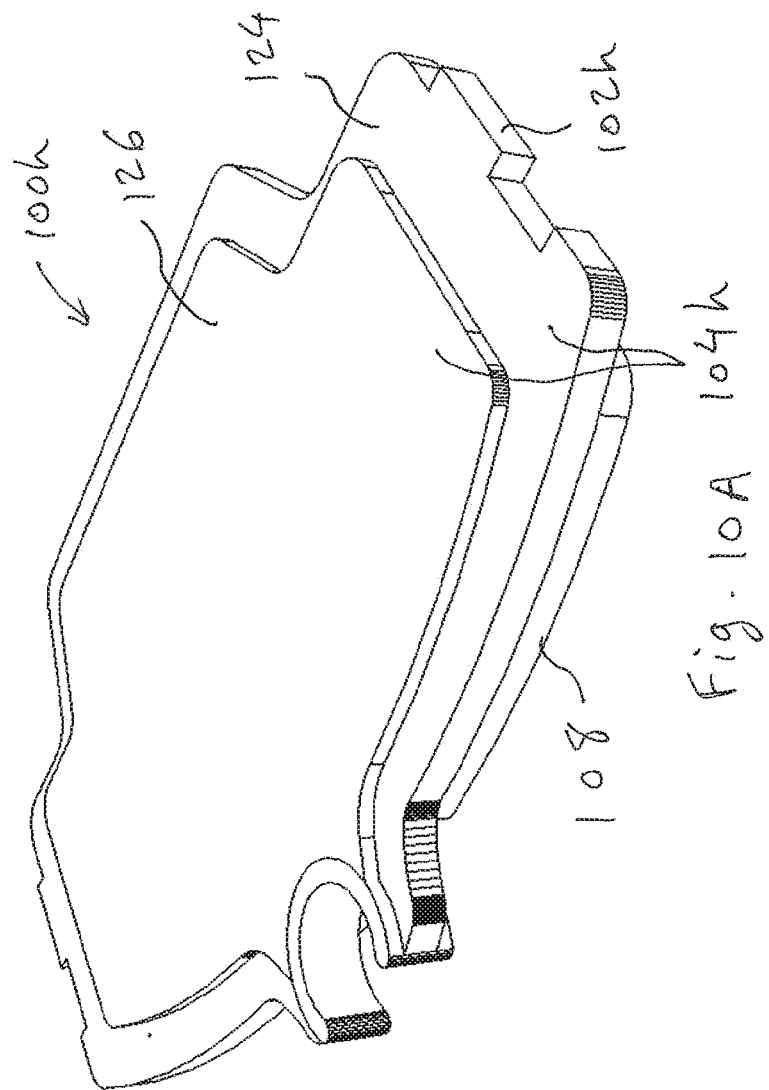

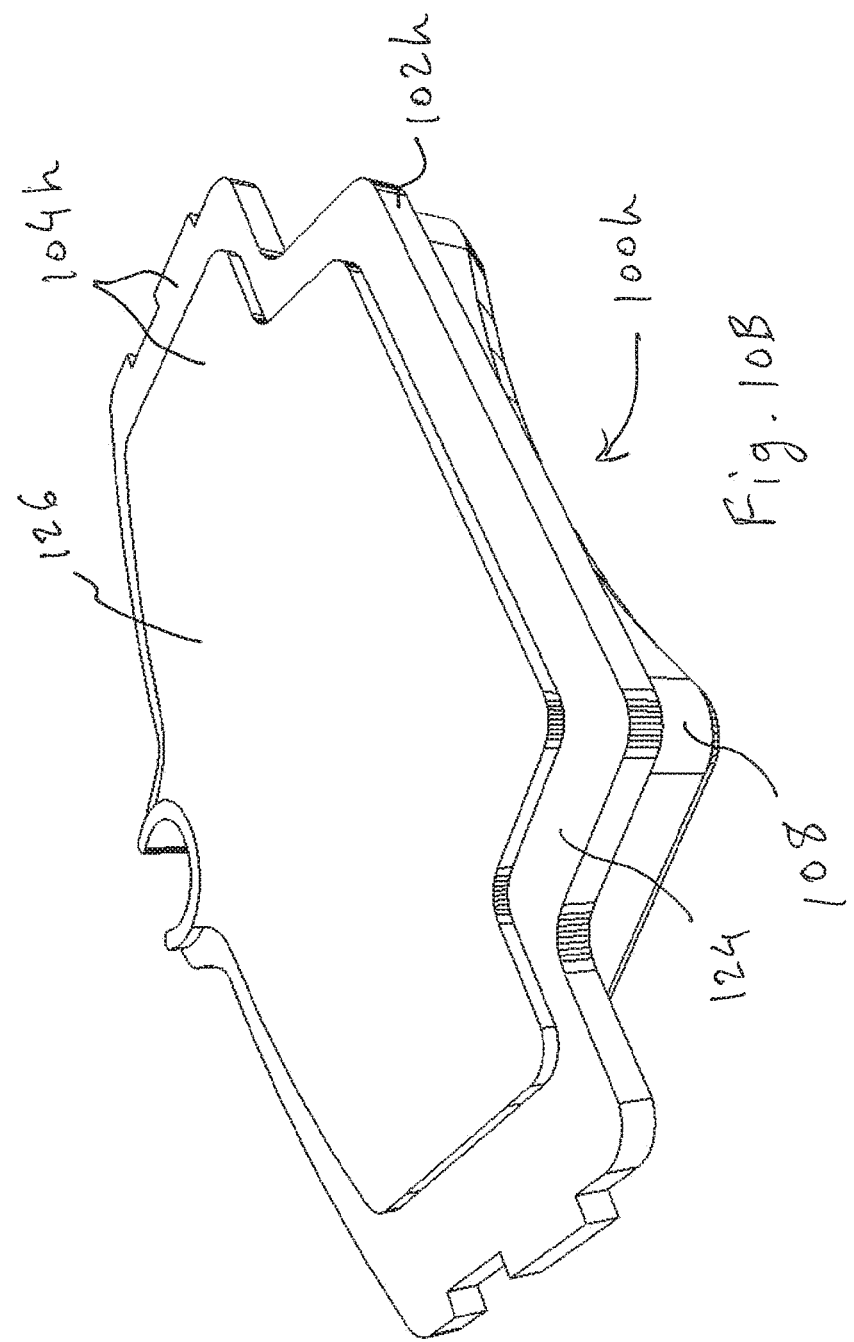

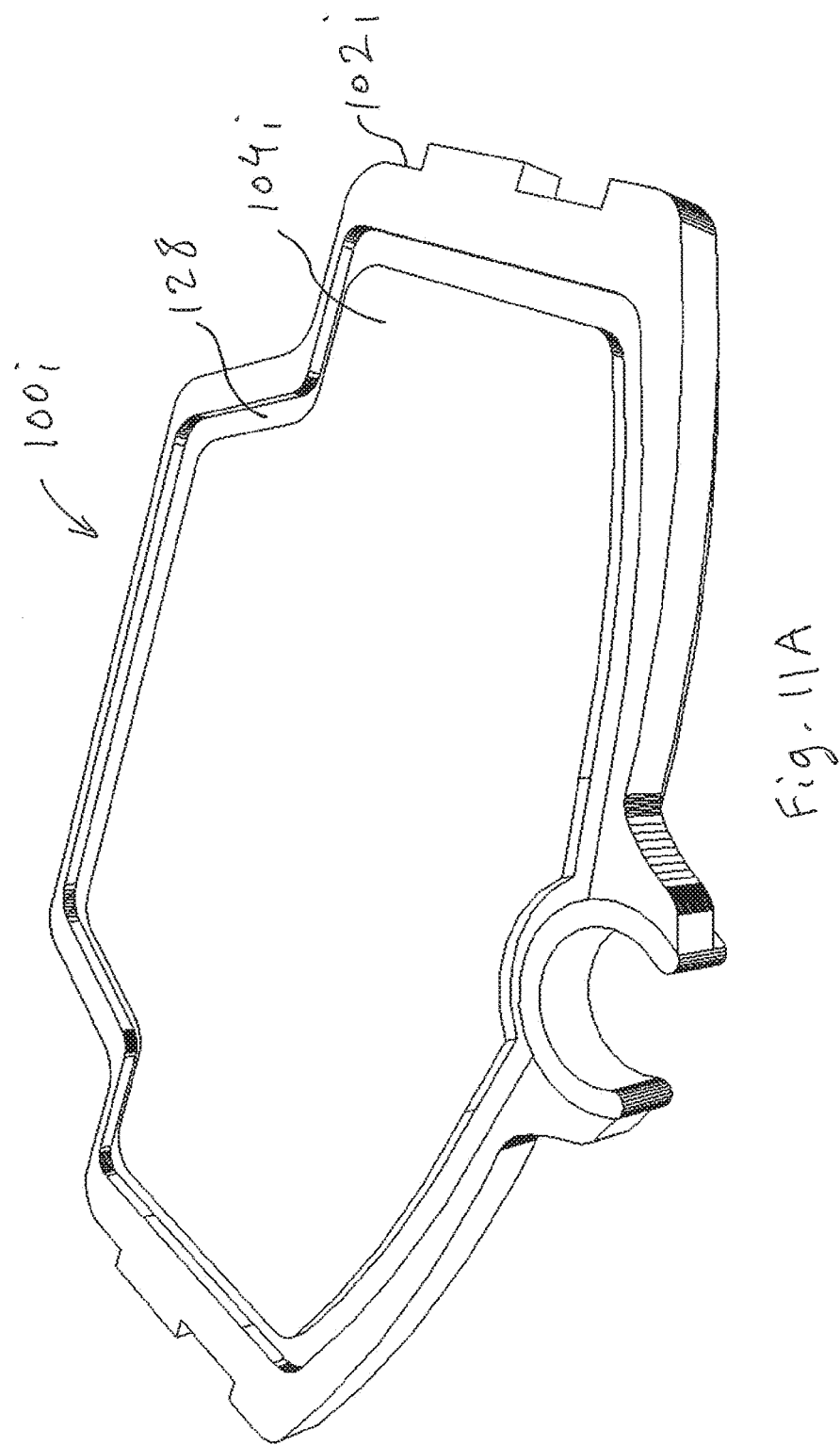

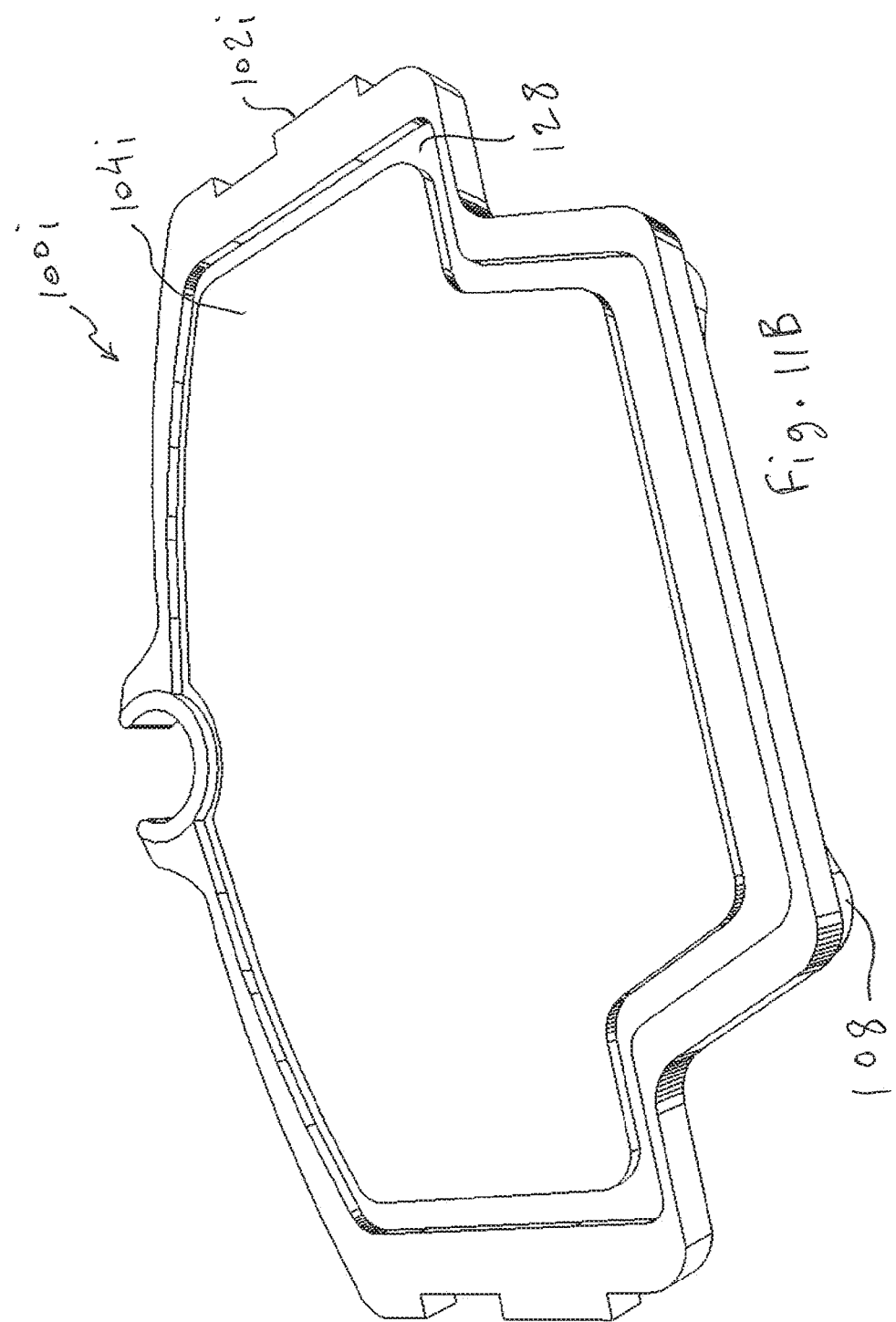

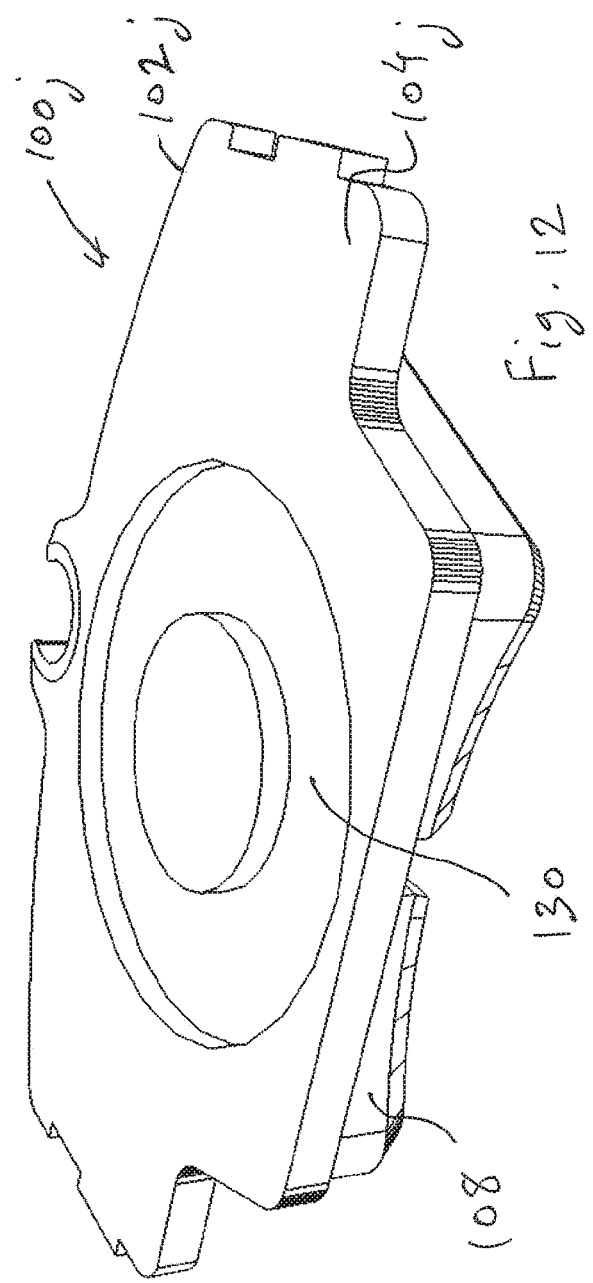

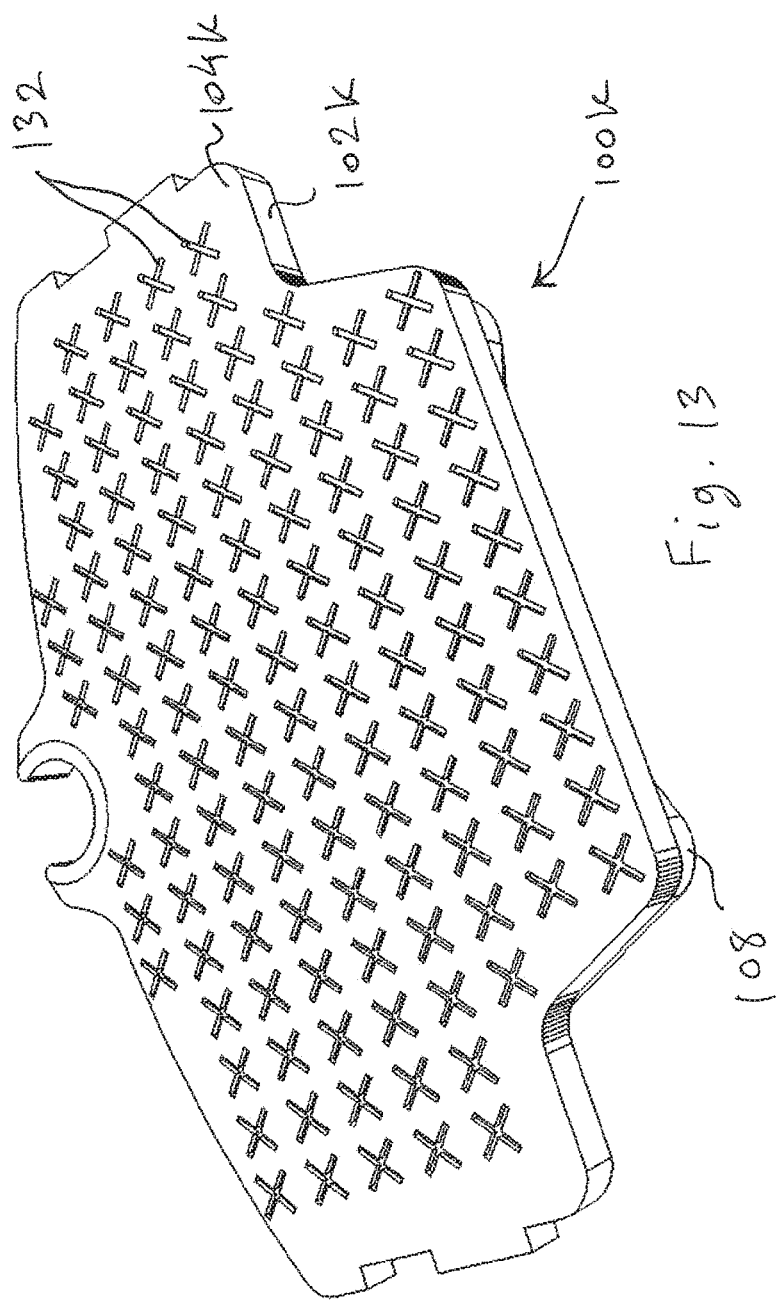

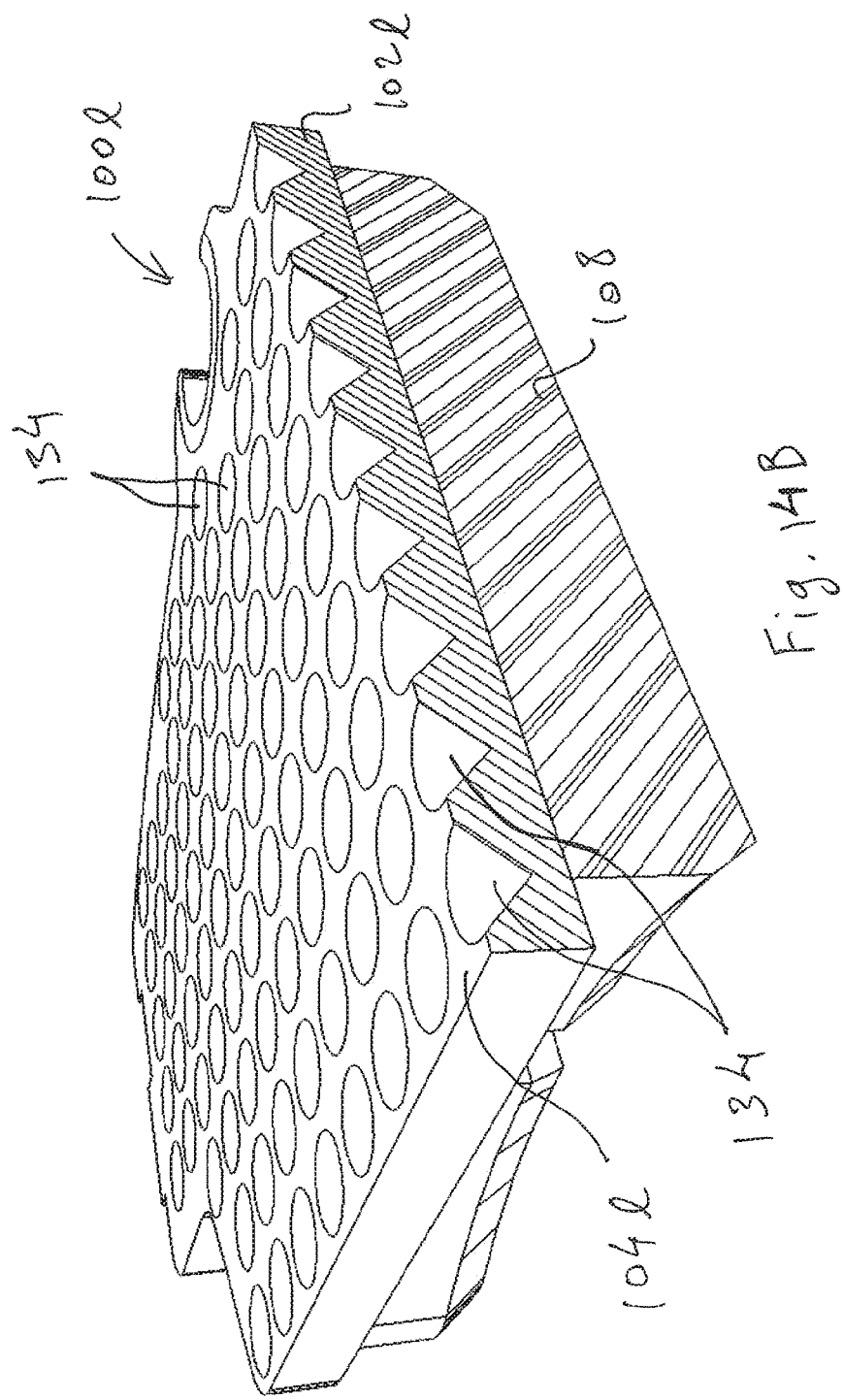

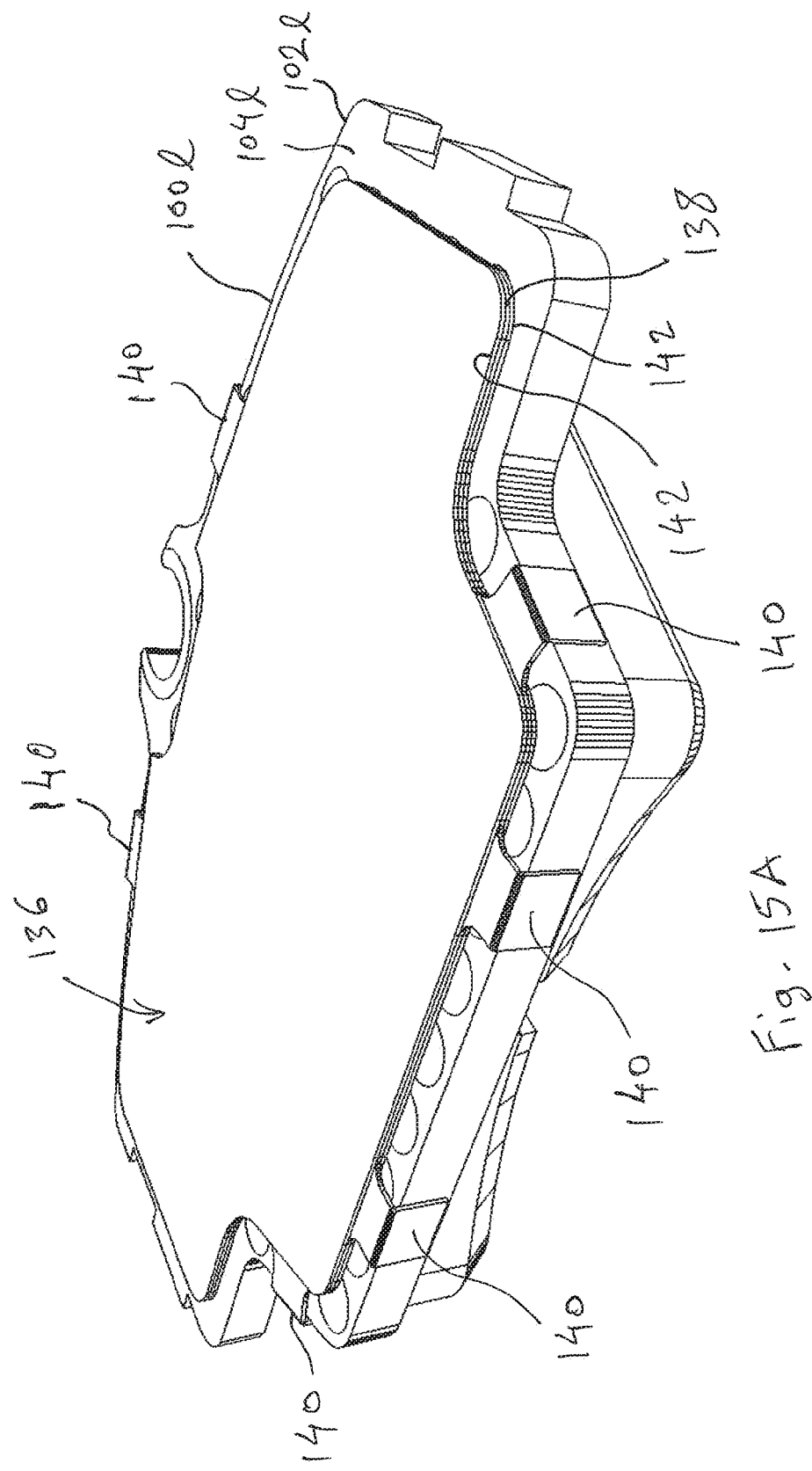

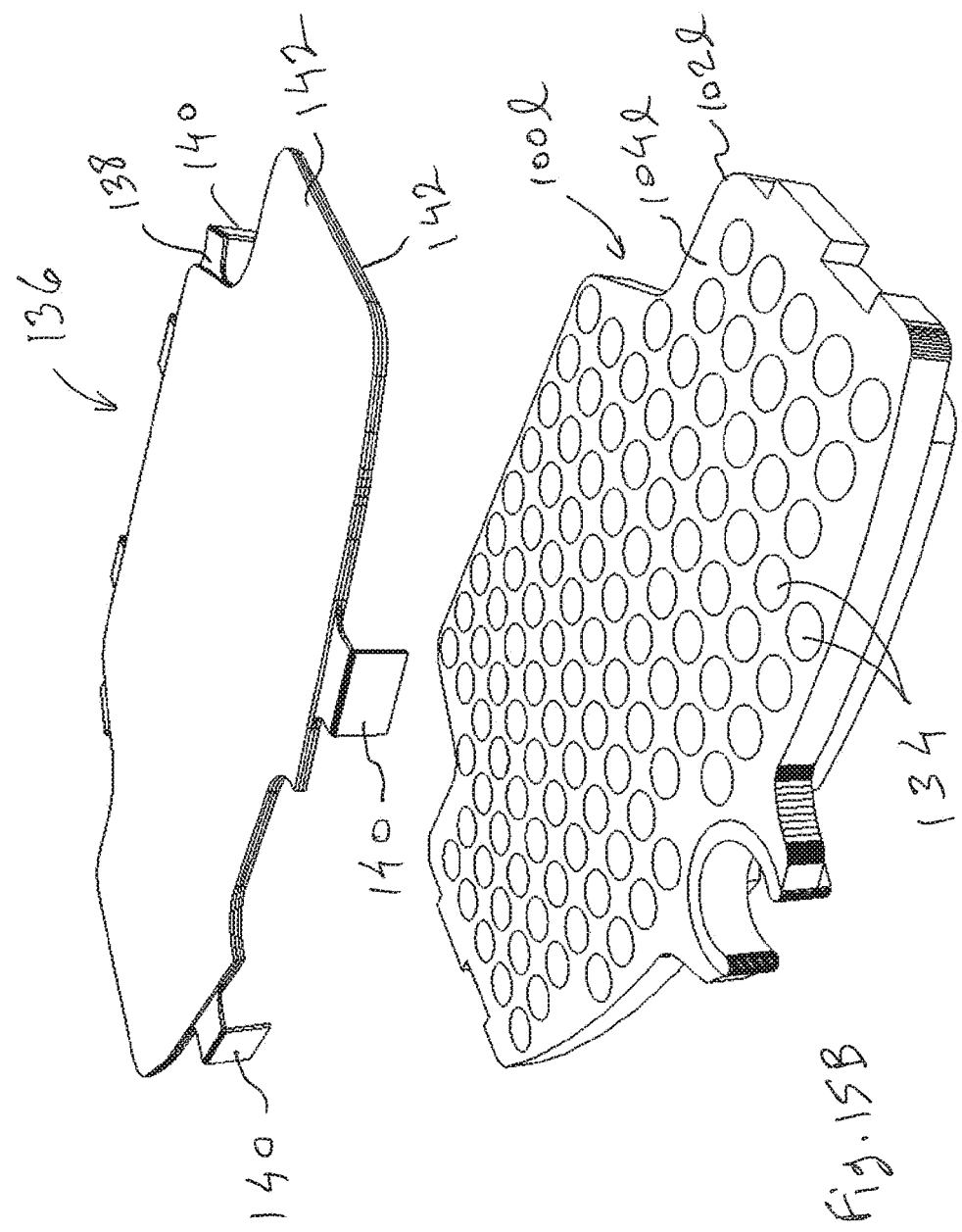

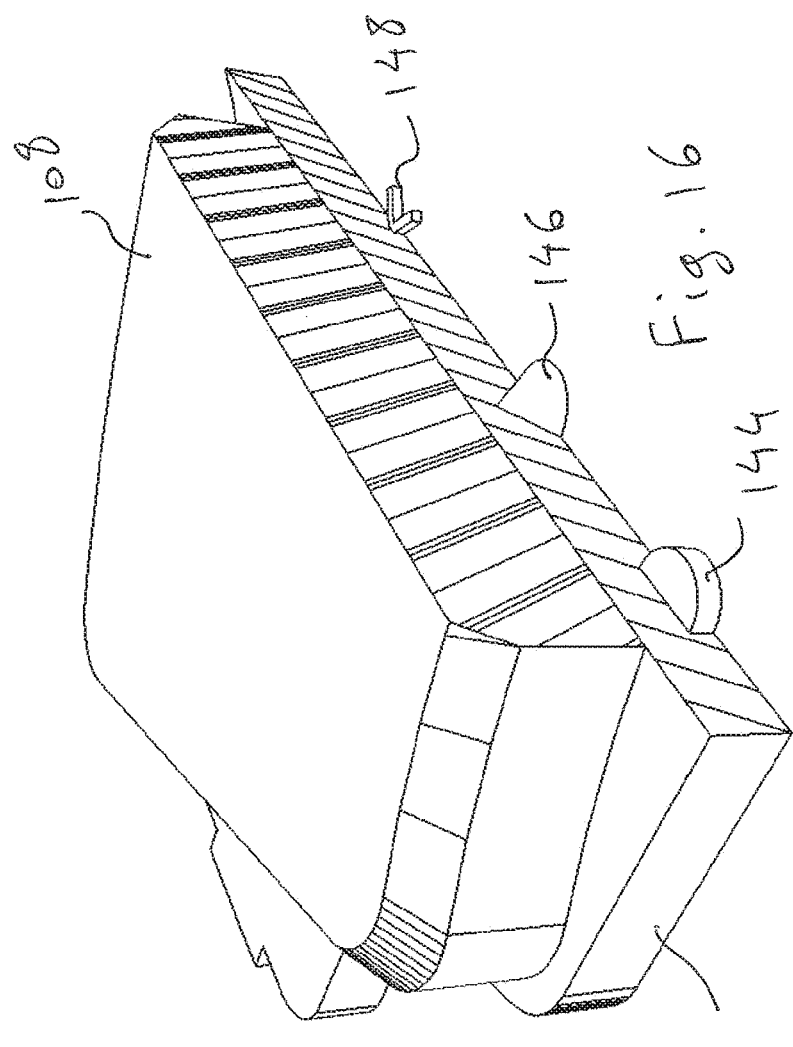

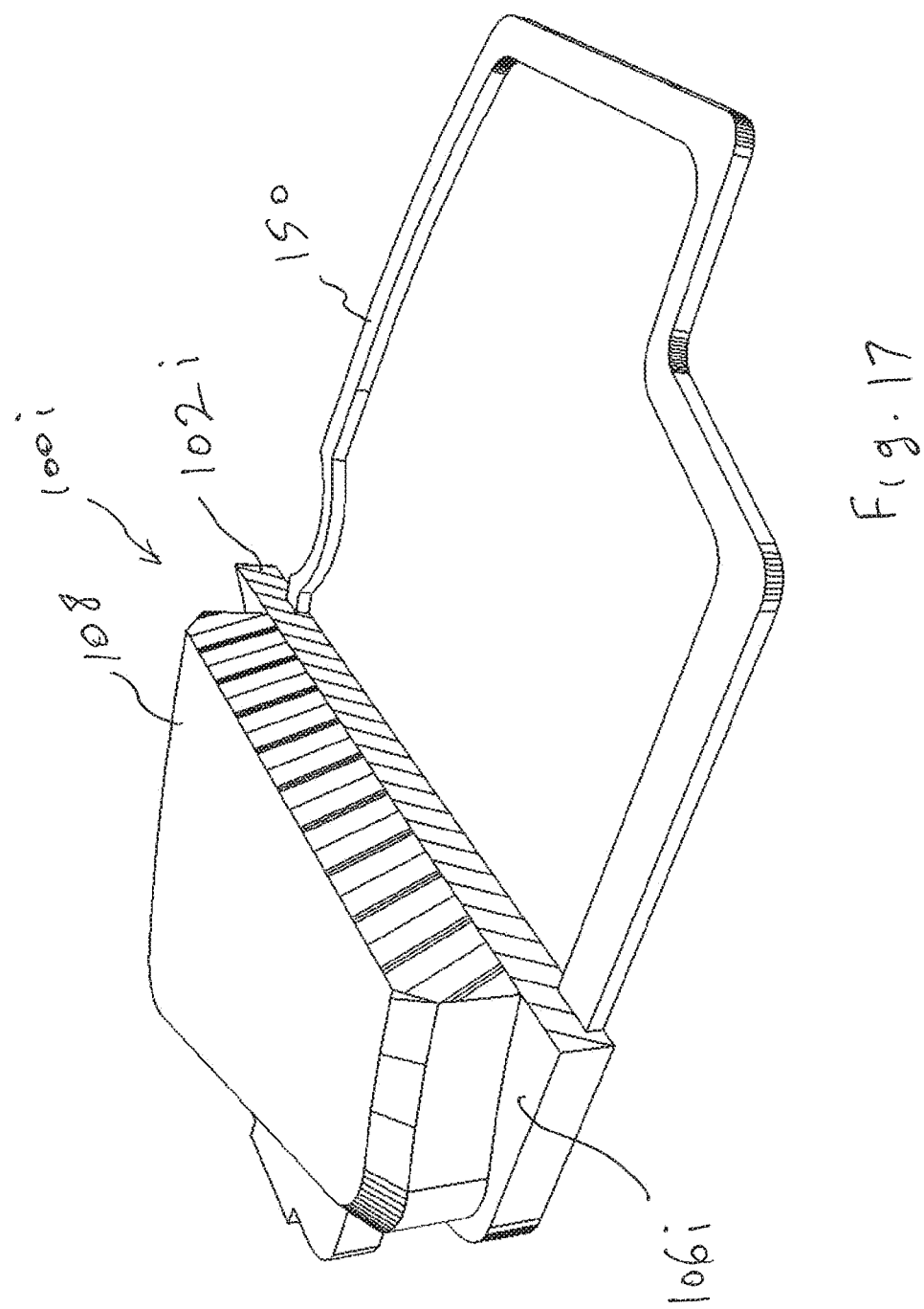

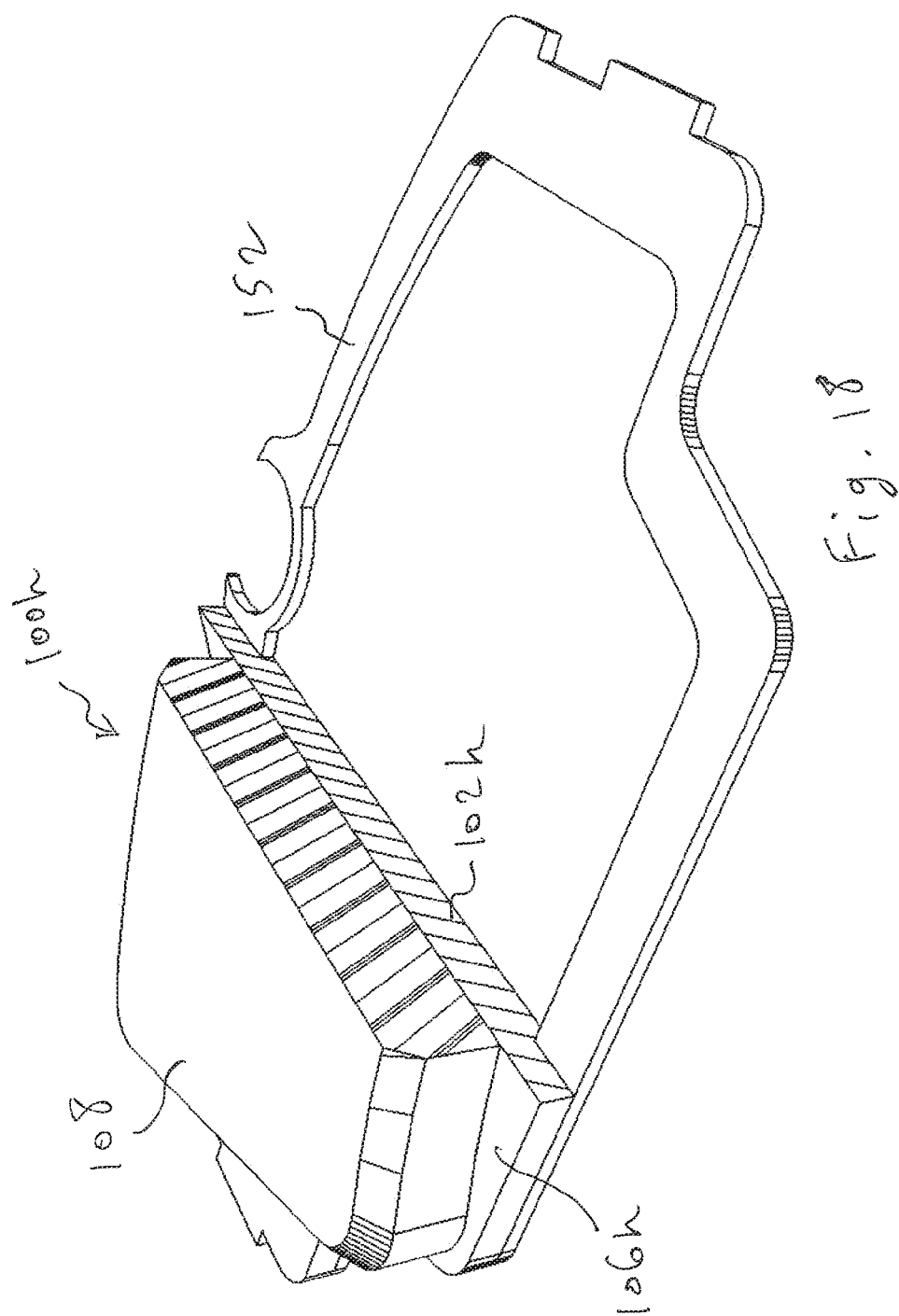

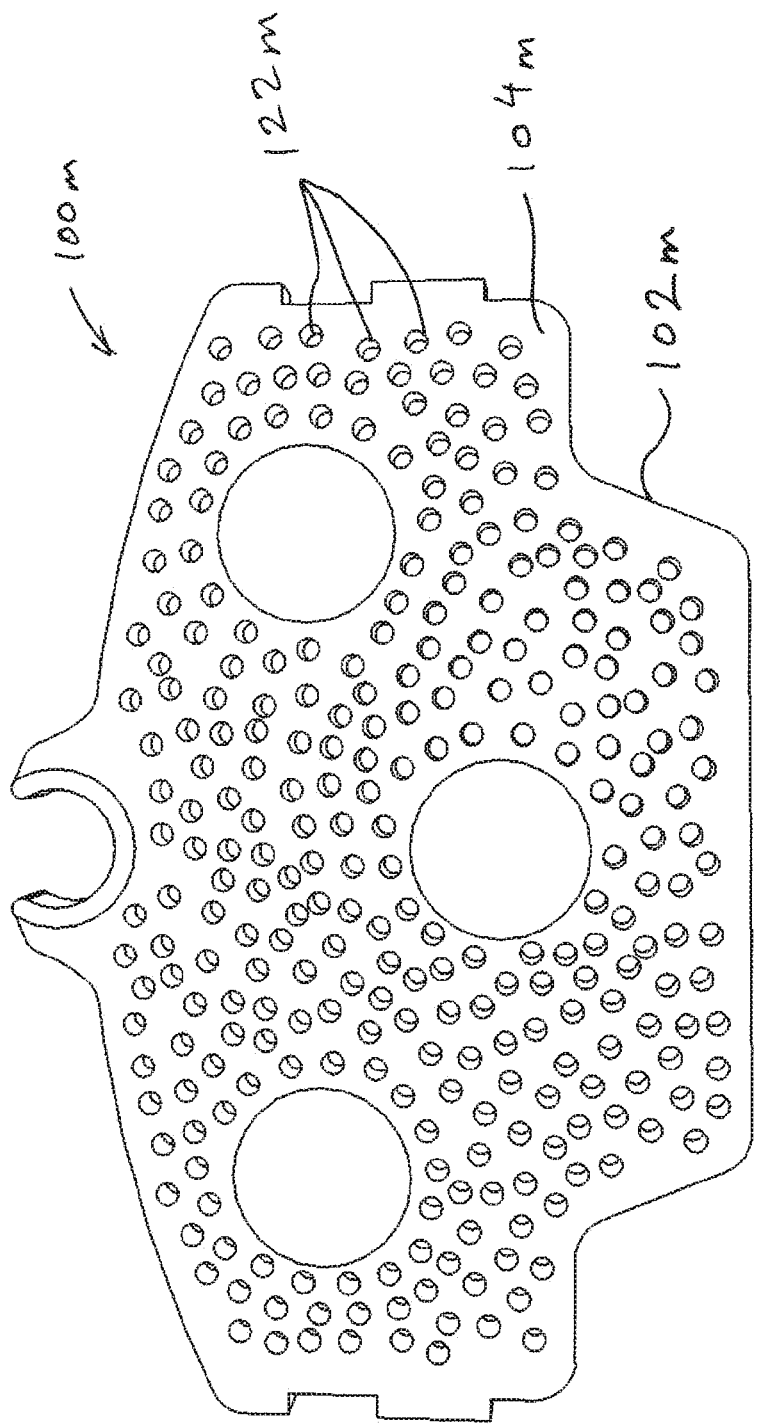

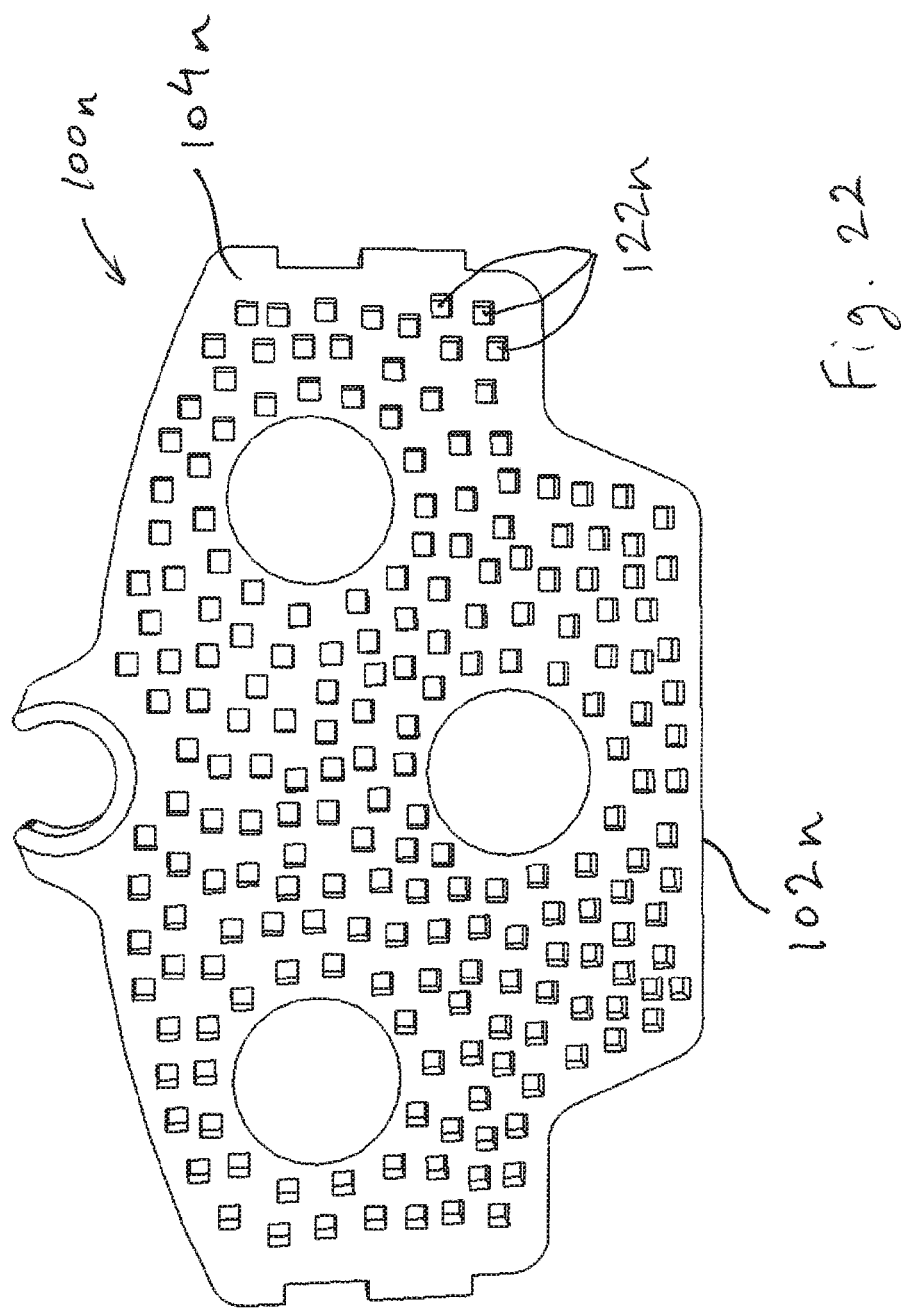

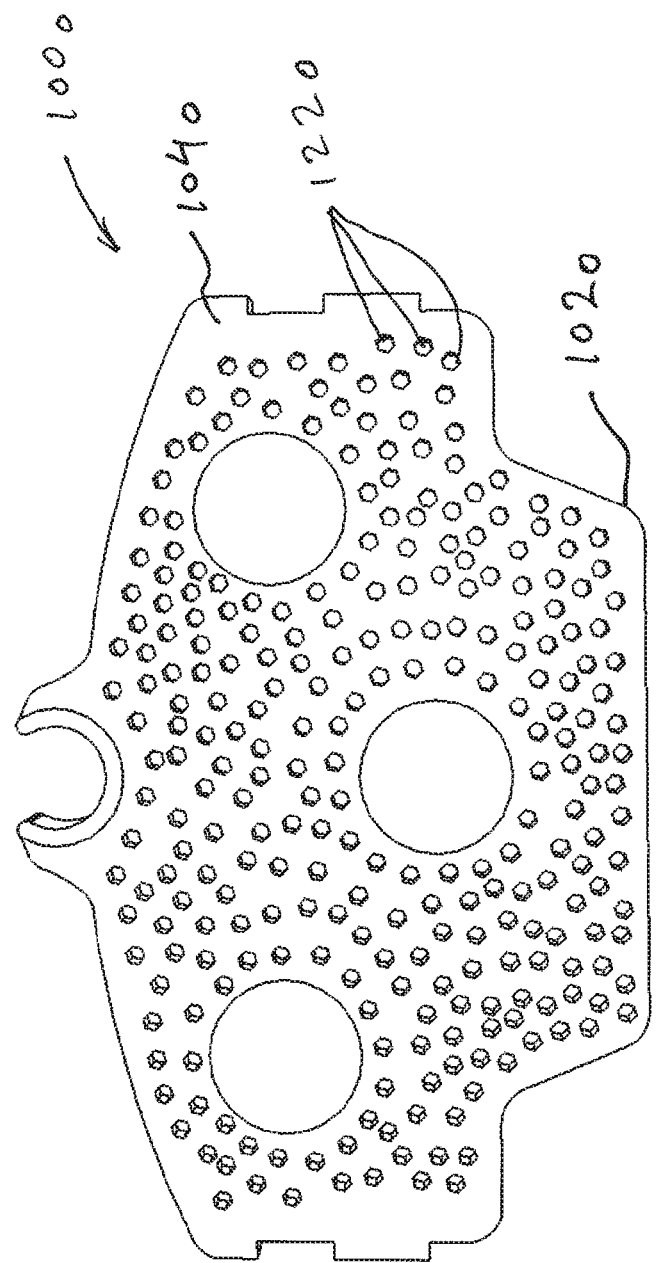

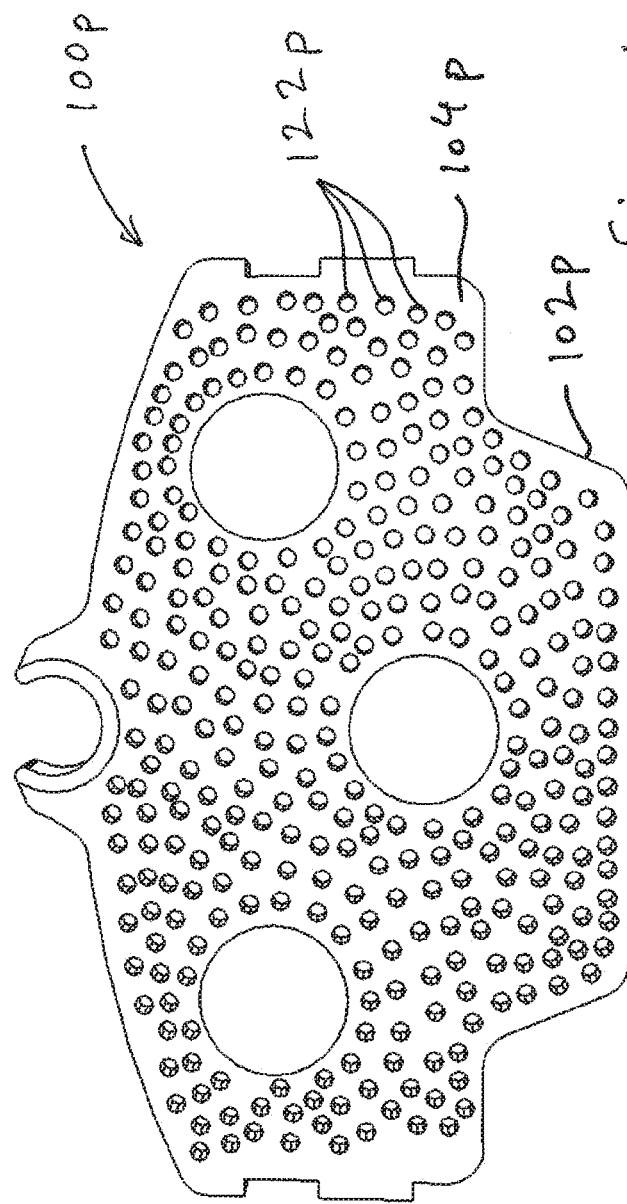

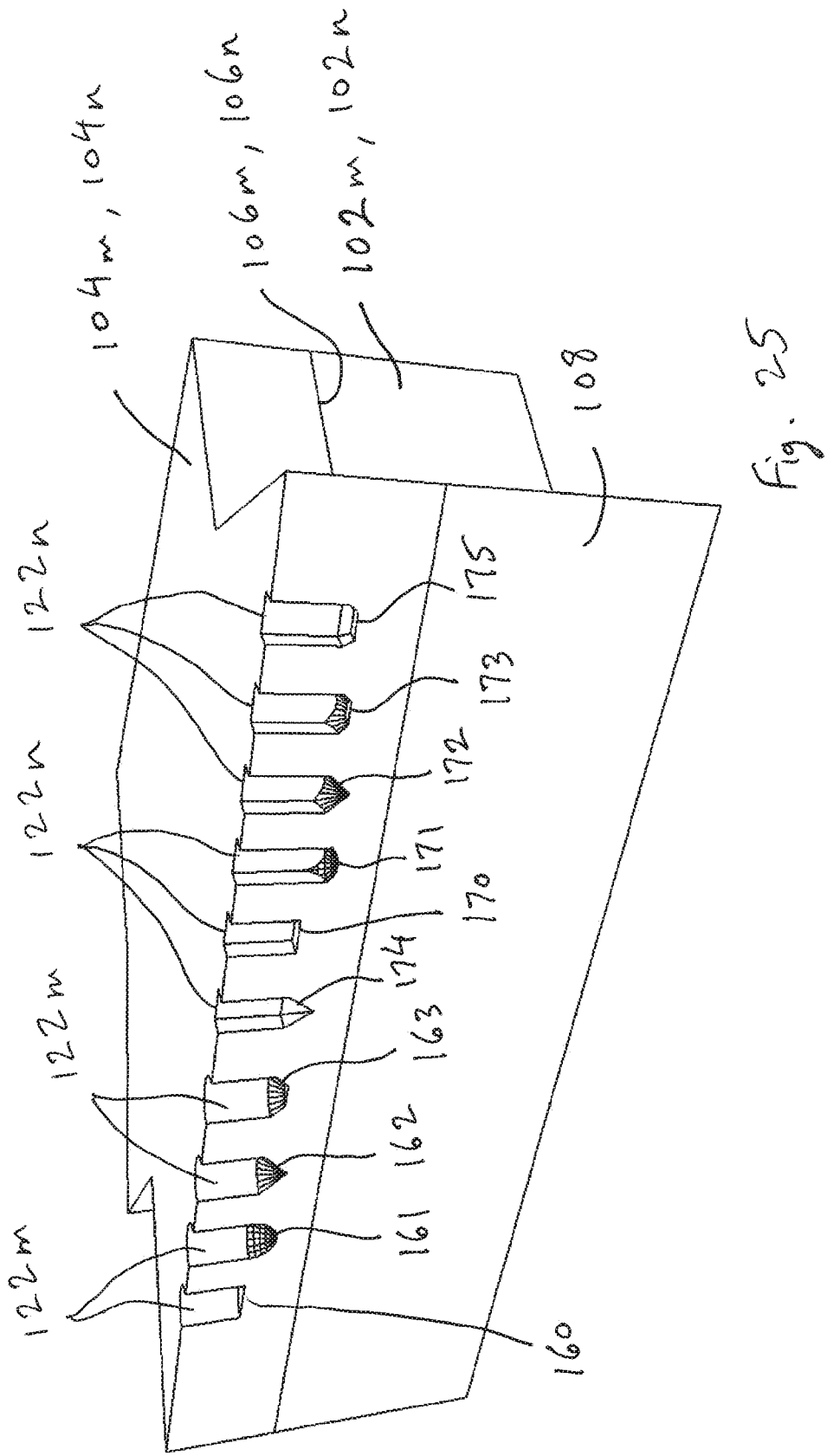

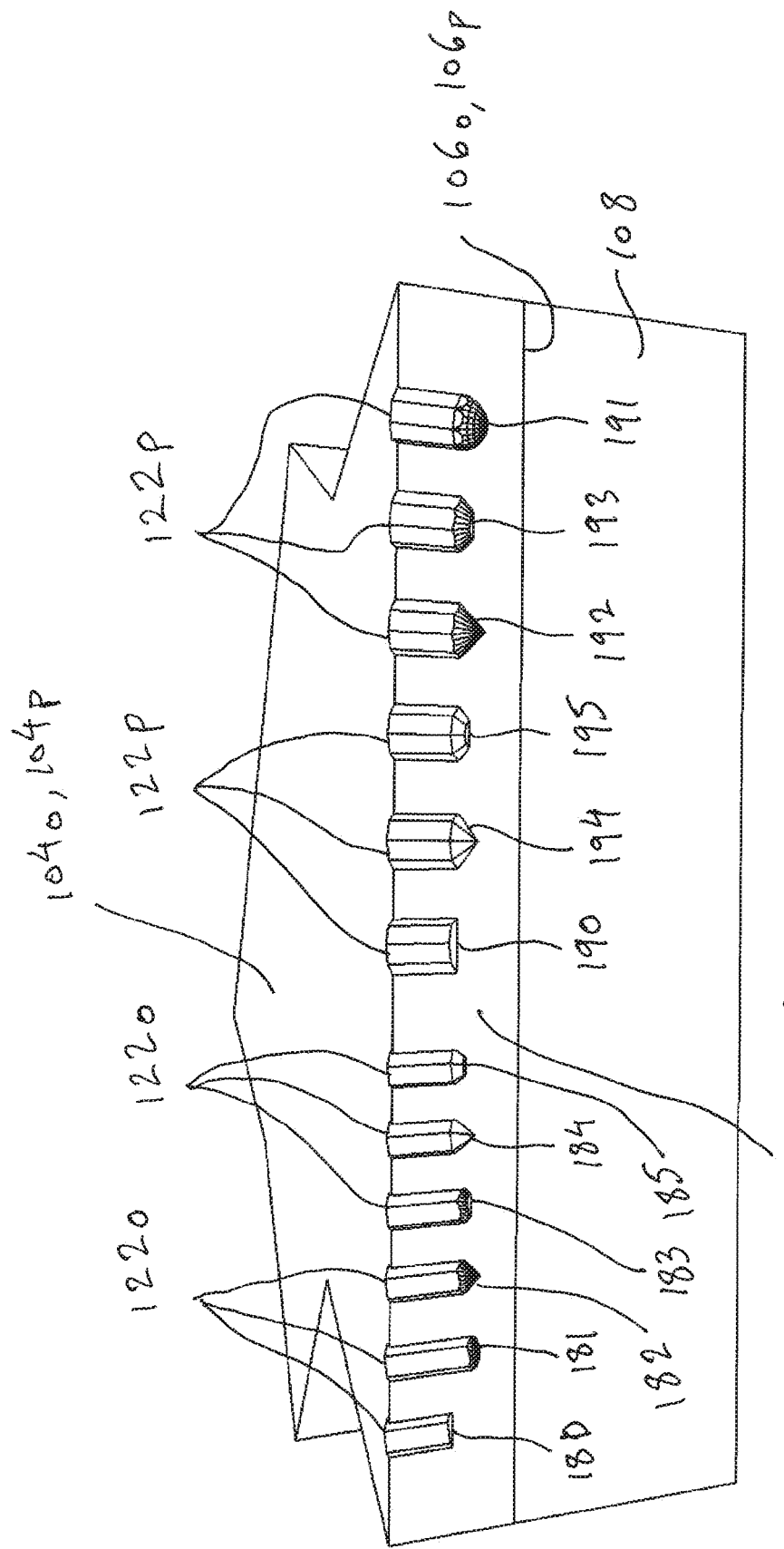

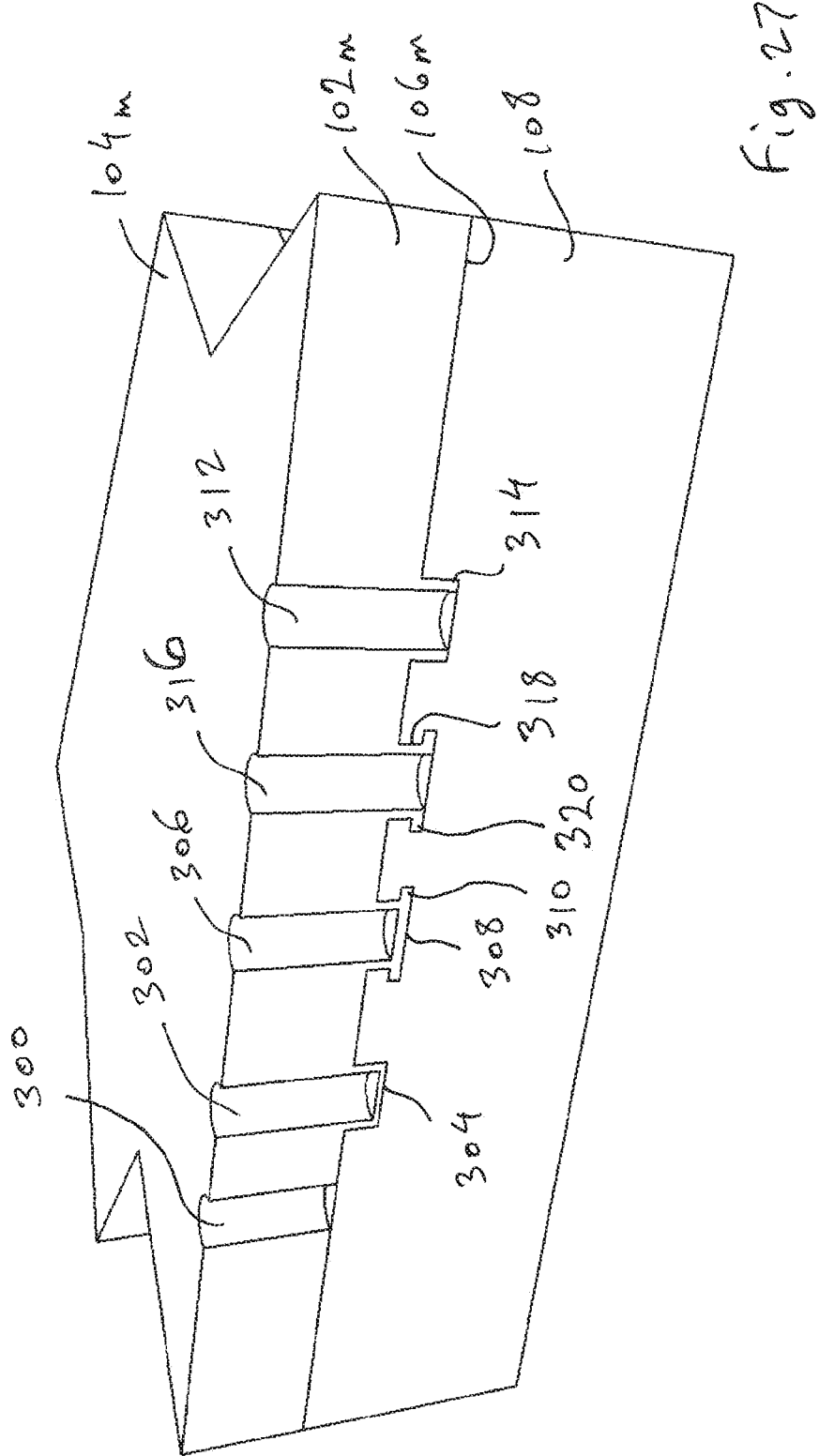

EMBOSSED BRAKE PAD

BACKGROUND OF THE INVENTION

1. Field of the Invention

The present invention relates to a brake pad for use with disc brake systems that has an integral noise reducing structure.

2. Description of the Prior Art

Disc brakes were used in the U.S. on a select group of vehicles in the mid to late 1960's. They did not become main stream until the early 1970's and by the end of the decade almost all vehicles produced in the U.S. had front disc brakes. Brake noise has always been a concern over the years. A number of techniques were developed to reduce noise in disc brakes including changes to the compound used in the friction material or the addition of chamfers, rounded edges, or slots to the friction material among other changes to the friction material.

An insulator consisting of a thin piece of metal and a dampening material was developed to stop noise in disc brake applications. Many configurations of insulators have been used over the years. Multiple layers consisting of rubber-steel-rubber, steel-rubber-steel, and a variety of materials have been used. Some have used further materials applied to the back plate.

The insulator was first used by the original equipment manufacturers ("OEMs") to reduce warranty claim rates from brake noise. Even though insulators did not stop all brake noise a small improvement was a big savings on vehicles covered by warranty.

The aftermarket equipment manufacturers commonly refer to insulators as shims because it appears as though the insulator is placed on the back of the pad to act as a shim.

Insulators have grown in popularity at the OEM level and in the aftermarket. Today almost all new cars and dealer service parts have insulators. All but a few aftermarket disc brake pads have insulators.

None of the prior art brake pads are seen to teach or suggest the unique features of the present invention or to achieve the advantages of the present invention.

SUMMARY OF THE INVENTION

The invention uses structural features that are at least in part integral to the back plate to reduce noise in brake pads in lieu of, or in combination with, the traditional method of reducing noise by application of a separate vibration insulator or cover for the back plate known in the art as a shim. The invention eliminates the problems and costs associated with applying the separate vibration insulators to the brake pads. The invention geometrically alters the back plate of the brake pad to change the resonant or natural frequency of the brake pad, thus increasing scattering and enhancing absorption. Attenuation of noise is as good or greater in back plates employing the techniques of the present invention as compared with brake pads employing the traditional methods of noise reduction. The geometry can be changed by machining or embossing. The benefits are substantial in that the invention will reduce costs, reduce weight, reduce noise and increase wearing thickness.

Accordingly, it is an object of the invention to provide a brake pad having an integral noise reduction feature.

It is another object of the invention to provide a brake pad that achieves adequate noise reduction at reduced cost.

It is yet another object of the invention to provide a brake pad having an integral pattern of indentations or cavities on the back side of the backing plate of the brake pad.

It is yet another object of the invention to provide a brake pad having an integral pattern of indentations or cavities on the back side of the backing plate of the brake pad that is simple to manufacture.

These and other objects of the present invention will become apparent from the attached description and drawings.

BRIEF DESCRIPTION OF THE DRAWINGS

FIG. 7 shows a brake pad in accordance with another embodiment of the present invention that has a pattern of vertical rows of cylindrical cavities provided on the backside of the back plate of the brake pad.

FIG. 8 shows a brake pad in accordance with yet another embodiment of the present invention that has a pattern of diagonal rows of cylindrical cavities provided on the backside of the back plate of the brake pad.

FIG. 9 shows a brake pad in accordance with yet another embodiment of the present invention that has a random pattern of cylindrical cavities provided on the backside of the back plate of the brake pad.

FIGS. 10A-10B show a brake pad in accordance with yet another embodiment of the present invention that has a cutout extending along the outer periphery of the backside of the back plate of the brake pad.

FIGS. 11A-11B show a brake pad in accordance with yet another embodiment of the present invention that has a groove extending in proximity to the outer periphery of the backside of the back plate of the brake pad.

FIG. 12 shows a brake pad in accordance with yet another embodiment of the present invention that has an annular groove provided in the backside of the back plate of the brake pad.

FIG. 13 shows a brake pad in accordance with yet another embodiment of the present invention that has a pattern of horizontal rows of X-shaped cavities provided on the backside of the back plate of the brake pad.

FIGS. 14A-14B show a brake pad in accordance with yet another embodiment of the present invention that has a pattern of vertical rows of conical cavities provided on the backside of the back plate of the brake pad.

FIGS. 15A-15B show a noise reducing shim or cover used in conjunction with a brake pad in accordance with the present invention.

FIG. 16 is a cutaway view illustrating noise damping material filling the cavities in the backside of the back plate of a brake pad in accordance with the present invention.

FIG. 17 is a cutaway view illustrating noise damping material filling the cavity in the backside of the back plate of a brake pad as illustrated in FIGS. 11A-11B.

FIG. 18 is a cutaway view illustrating noise damping material filling the cavity in the backside of the back plate of a brake pad as illustrated in FIGS. 10A-10B.

FIG. 21 shows a brake pad in accordance with yet another embodiment of the present invention that has a random pattern of cylindrical cavities with diameters of approximately 0.1 inch provided on the backside of the back plate of the brake pad.

FIG. 22 shows a brake pad in accordance with yet another embodiment of the present invention that has a random pattern of cavities in the shape of square base parallelepipeds provided on the backside of the back plate of the brake pad.

FIG. 23 shows a brake pad in accordance with yet another embodiment of the present invention that has a random pattern of cavities with hexagonal cross sections provided on the backside of the back plate of the brake pad.

FIG. 24 shows a brake pad in accordance with yet another embodiment of the present invention that has a random pattern of cavities with octagonal cross sections provided on the backside of the back plate of the brake pad.

FIG. 25 is a fragmentary view showing a sampling of the variety of inner end geometries that can be used with the cavities having circular or square cross sections provided in the backside of the back plate of the brake pads according to the present invention.

FIG. 26 is a fragmentary view showing a sampling of the variety of inner end geometries that can be used with the cavities having hexagonal or octagonal cross sections provided in the backside of the back plate of the brake pads according to the present invention.

FIG. 27 is a fragmentary view showing a sampling of the variety of cavity geometries, including cavities that extend through the entire thickness of the back plate, cavities that terminate in projections on the front side of the back plate, and cavities that extend through projections on the front side of the back plate, that can be used for the cavities provided in the back plate of the brake pads according to the present invention.

DETAILED DESCRIPTION OF THE PREFERRED EMBODIMENTS

Figure 1:
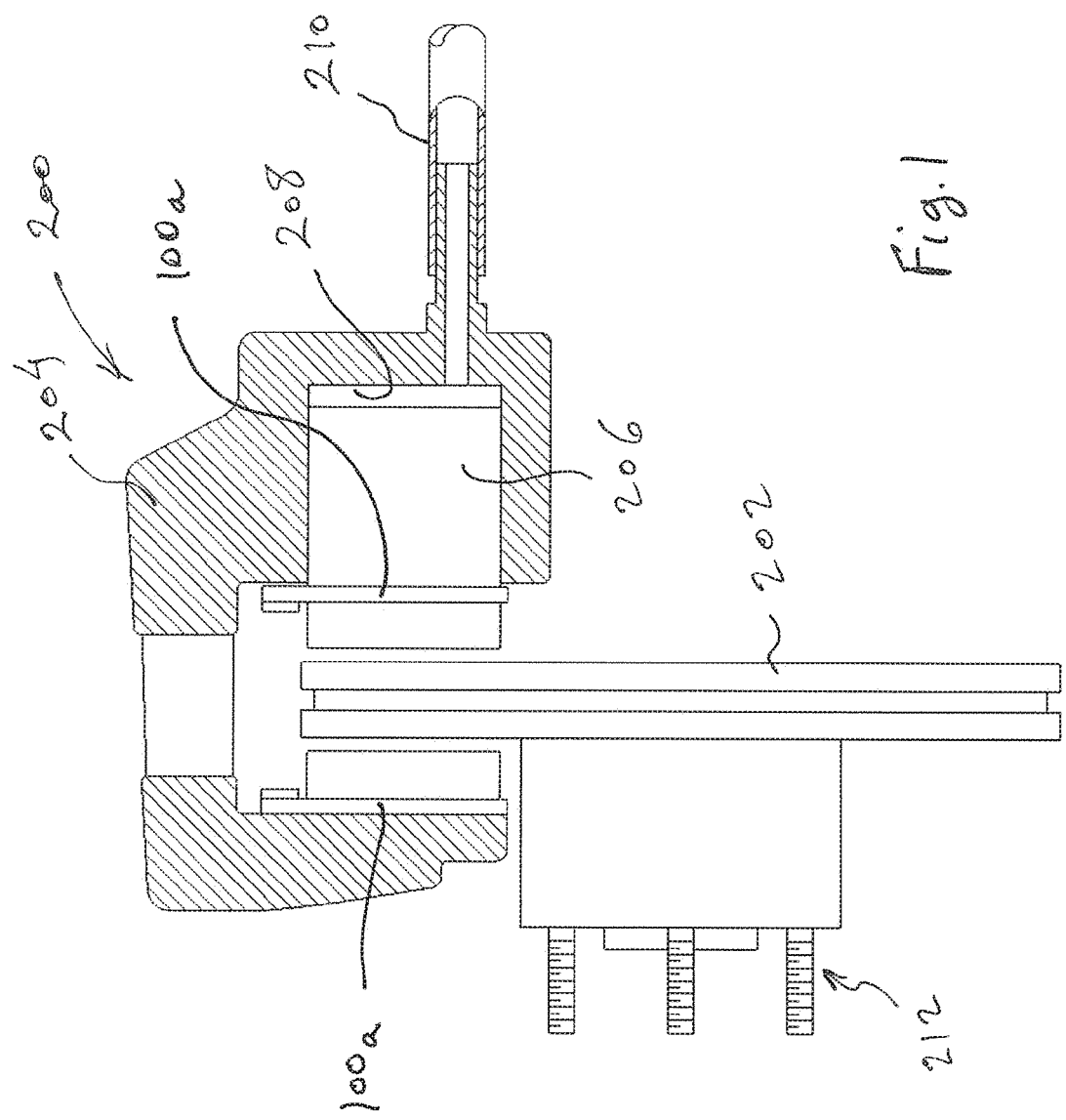
FIG. 1 is an environmental view showing the general configuration of a disc brake system including a pair of brake pads.
Figure 2:
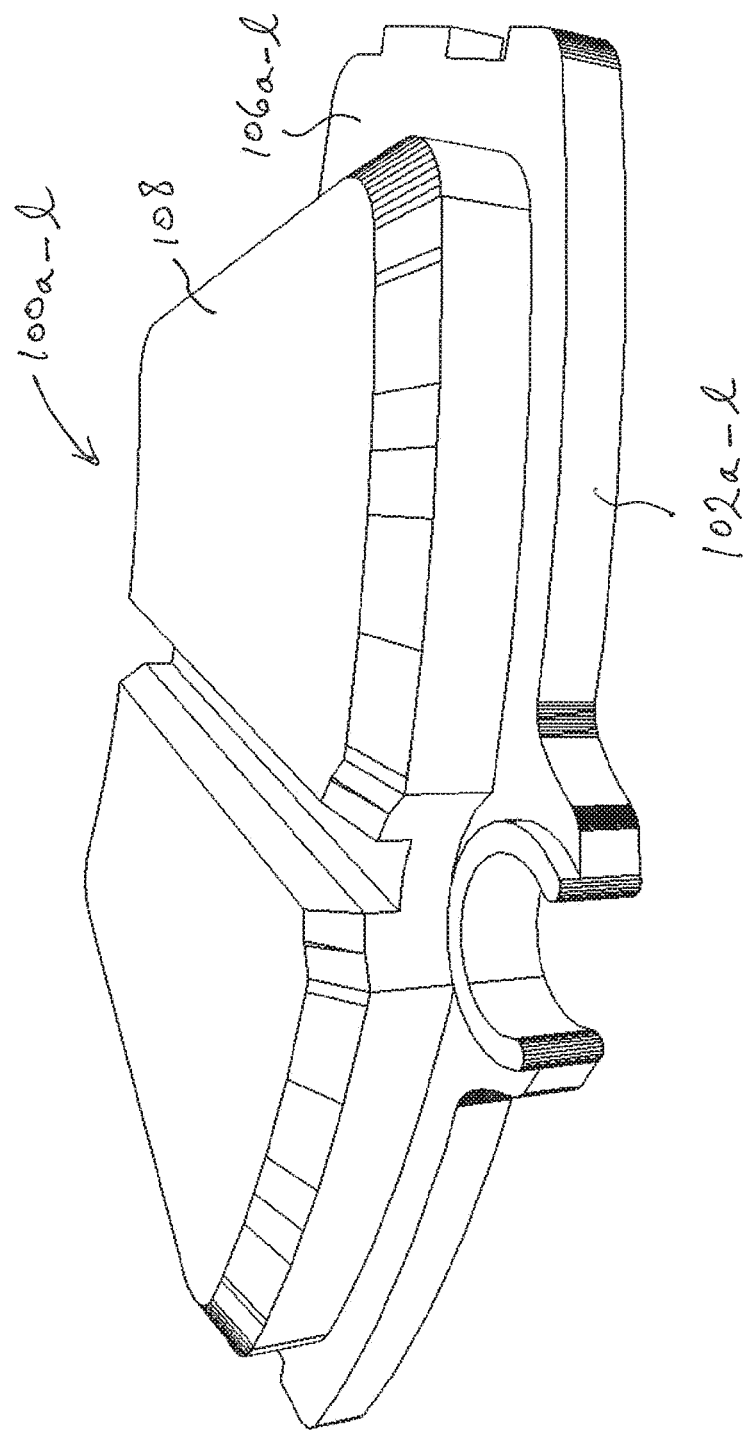
FIG. 2 is an isometric view of a brake pad showing the brake lining that frictionally engages the brake rotor to slow or stop the vehicle.
Figure 3:
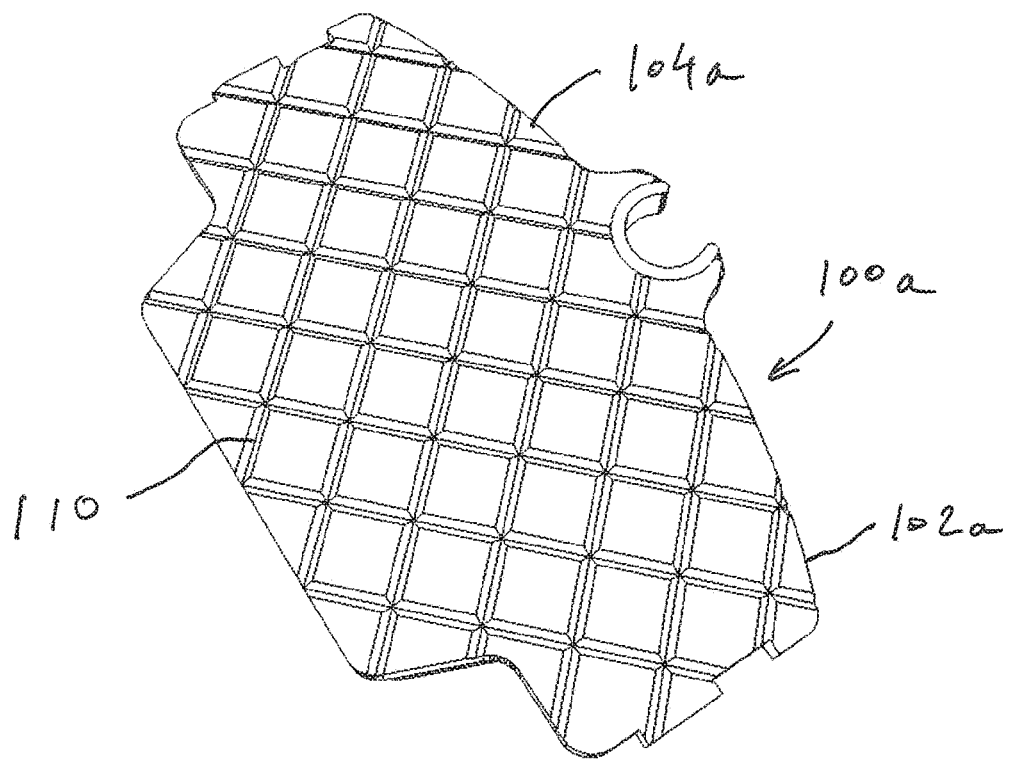
FIG. 3 shows a brake pad in accordance with a first embodiment of the present invention that has a crisscross pattern of grooves having a triangular cross section provided on the backside of the back plate of the brake pad.
Figure 4:
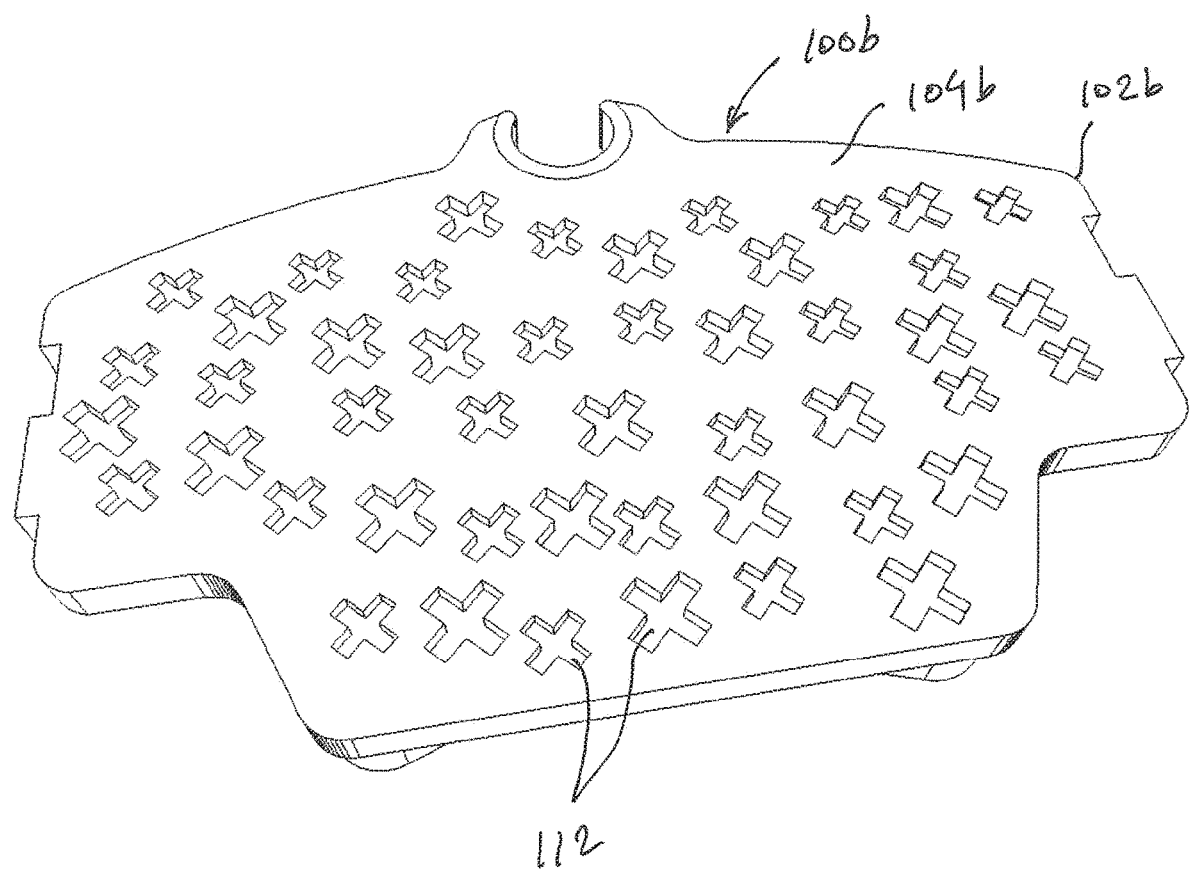
FIG. 4 shows a brake pad in accordance with a second embodiment of the present invention that has a random pattern of X-shaped indentations provided on the backside of the back plate of the brake pad.
Figure 5:
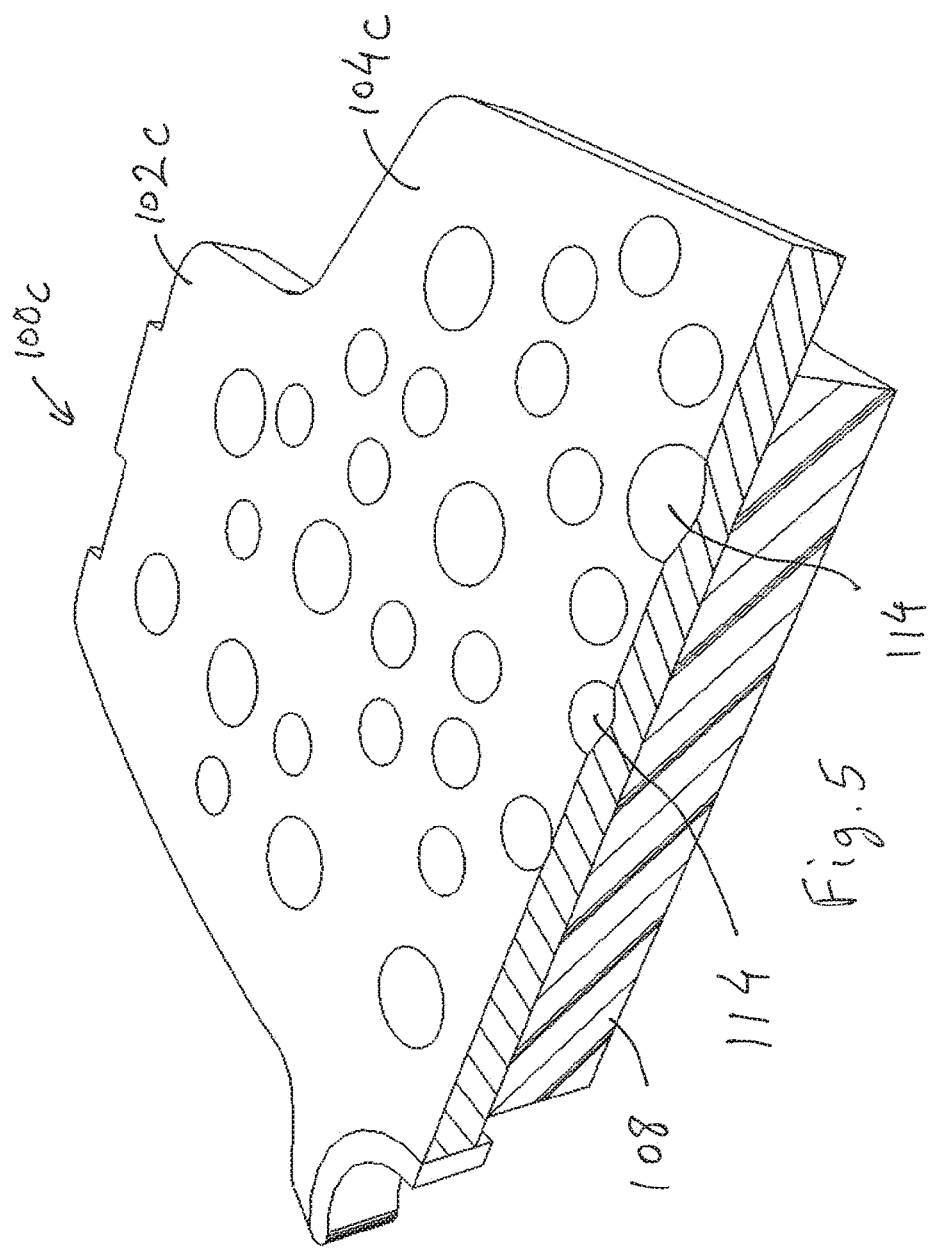
FIG. 5 shows a brake pad in accordance with a third embodiment of the present invention that has a random pattern of conical indentations provided on the backside of the back plate of the brake pad.
Figure 6:
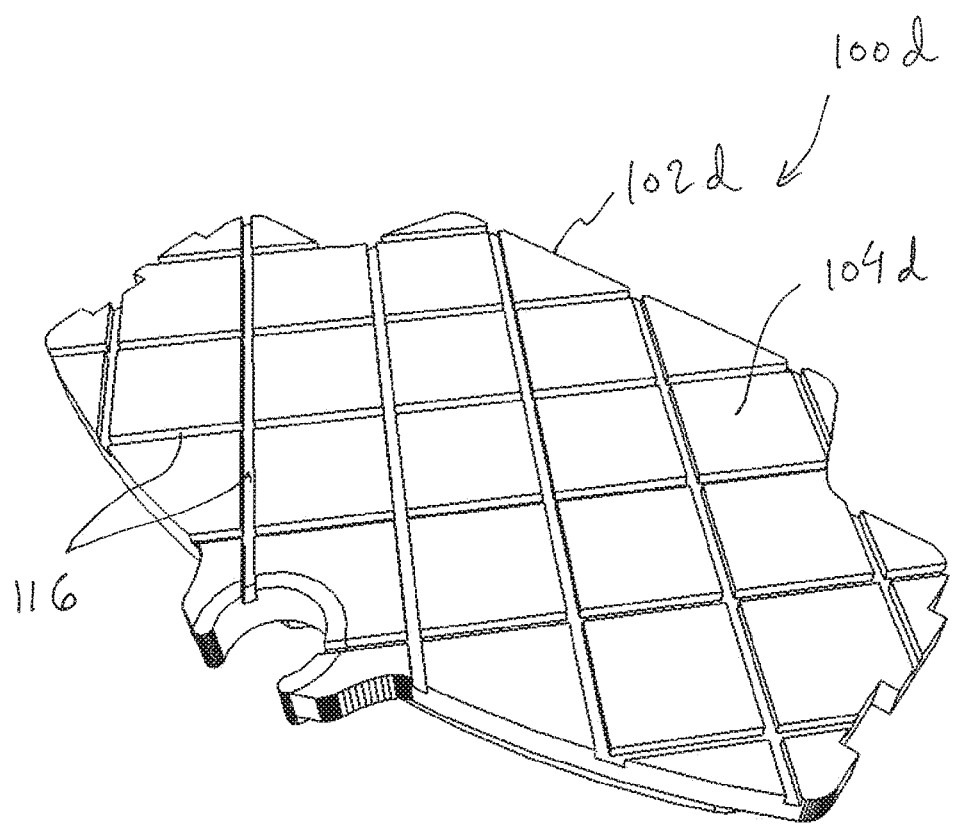
FIG. 6 shows a brake pad in accordance with a fourth embodiment of the present invention that has a crisscross pattern of grooves having a rectangular cross section provided on the backside of the back plate of the brake pad.

Referring to FIGS. 1-20, the present invention is directed to brake pads, such as for example brake pads 100a-1, that are provided with an integral noise reduction structure. The integral noise reduction structure primarily includes indentations or cavities formed in the back surface of the back plate of the brake pad. The cavities or indentations may include one or more individual cavities or a plurality of interconnected cavities. The cavities have a top opening that is essentially coplanar with the back surface of the back plate of the brake pad. The maximum depth of the cavities or indentations is less than the thickness of the back plate of the brake pad such that the cavities or indentations do not penetrate completely through the thickness of the back plate of the brake pad. Accordingly, the cavities or indentations are closed at one end, in other words the cavities or indentations are blind, and the cavities or indentations at most extend through a portion of the thickness of the back plate of the brake pad. The patterns of the cavities are a combination of straight lines or curved lines both intersecting and not intersecting. Spacing is dependent upon the amplitude and frequency of the vibration being dampened. The deeper the cavity, the more effective the dampening of the noise will be. Proper selection of depth and configuration can increase stiffness and strength of the back plate. The depth and the pattern must be carefully chosen so as not to structurally degrade the back plate. Effective cavity depths can range from as little as 0.003 inch to 0.210 inch depending upon the thickness of the back plate. The patterns of cavities tested had cavity depths within a range from approximately 0.015 inch to approximately 0.075 inch. Some of the patterns of cavities tested had cavity widths within a range of approximately one thirty seconds (1/32 inch) of an inch to approximately one eighth (1/8 inch) of an inch.

The brake pad 100a has a back plate 102a that has a back side 104a and a front side 106a. The front side is covered in large part by the friction lining 108 as is typical for a brake pad. The brake lining 108 is made of any of the well-known materials typically employed for brake linings. Suitable material for brake linings include, but are not limited to, Aramid-containing, TWARON®-containing or other composites; however, any known material suitable for use as brake lining may be used for the brake liners in the brake pads of the present invention without departing from the scope of the present invention. The brake pads 100a, 100b, 100c and 100d are designed to be drop-in replacements for the standard brake pads of disc brake systems.

The brake pad 100a has a crisscross pattern of grooves provided on the backside 104a of the back plate 102a of the brake pad. The grooves 110 have triangular cross sections. Grooves having rectangular or trapezoidal cross sections may also be employed in the brake pad according to the present invention.

The brake pad 100d has a crisscross pattern of grooves provided on the backside 104d of the back plate 102d of the brake pad. The grooves 116 have rectangular cross sections. The front side 106d of the back plate 102d is covered in large part by the friction lining 108 as is typical for a brake pad.

The brake pad 100b has a random pattern of X-shaped indentations 112 provided on the backside 104b of the back plate 102b of the brake pad. The X-shaped indentations 112 are randomly distributed on the back side of the back plate of the brake pad 100b and are of a variety of different sizes including different depths and different areas as seen in plan view. Each of the X-shaped indentations 112 are provided by pairs of perpendicular grooves having rectangular cross sections. The X-shaped indentations 112 may also be formed by grooves having rectangular or trapezoidal cross sections. The orientation of the X-shaped indentations 112 may also be varied. For example, the X-shaped indentations 112 may be oriented in the same way as "plus" signs or have any other angular orientation. In addition, the X-shaped indentations 112 may have randomly varying orientations. The front side 106b of the back plate 102b is covered in large part by the friction lining 108 as is typical for a brake pad.

The brake pad 100c has a random pattern of conical indentations 114 provided on the backside 104c of the back plate 102c of the brake pad. The conical indentations 114 are randomly distributed on the back side of the backing plate of the brake pad 100c and are of a variety of different sizes including different depths and different areas as seen in plan view. In addition to the conical indentations illustrated, pyramidal, tetrahedral, rhomboid, spherical, cylindrical, elliptical, ogival indentations or cavities, and cavities in the shape of a rectangular parallelepiped, or any combinations of these, may be employed in a brake pad in accordance with the present invention. The front side 106c of the back plate 102c is covered in large part by the friction lining 108 as is typical for a brake pad.

Referring to FIG. 7, a brake pad 100e in accordance with yet another embodiment of the present invention can be seen. The brake pad 100e has a pattern of vertical rows of cylindrical cavities 118 provided on the backside 104e of the back plate 102e of the brake pad 100e.

The brake pad 100e has the cylindrical cavities 118 provided in evenly spaced rows on the backside 104e of the back plate 102e of the brake pad. Each row of cylindrical cavities extends along a line parallel to the central plane of symmetry of the brake pad 100e, which is perpendicular to the back plate 102e and passes through the middle of the brake pad and divides the brake pad into two symmetrical halves. The front side 106e of the back plate 102e is covered in large part by the friction lining 108 as is typical for a brake pad.

Referring to FIG. 8, a brake pad 100f in accordance with yet another embodiment of the present invention can be seen. The brake pad 100f has a pattern of diagonal rows of cylindrical cavities 120 provided on the backside 104f of the back plate 102f of the brake pad 100f.

The brake pad 100f has the cylindrical cavities 120 provided in evenly spaced rows on the backside 104f of the back plate 102f of the brake pad. Each row of cylindrical cavities extends along a line that is at a 45° angle to the central plane of symmetry of the brake pad 100f, which is perpendicular to the back plate 102f and passes through the middle of the brake pad and divides the brake pad into two symmetrical halves. The front side 106f of the back plate 102f is covered in large part by the friction lining 108 as is typical for a brake pad.

Referring to FIG. 9, a brake pad 100g in accordance with yet another embodiment of the present invention can be seen. The brake pad 100g has a random pattern of cylindrical cavities 122 provided on the backside 104g of the back plate 102g of the brake pad 100g.

The cylindrical cavities 122 are randomly distributed on the back side of the back plate of the brake pad 100g and are of a variety of different sizes including different depths and different areas as seen in plan view. The front side 106g of the back plate 102g is covered in large part by the friction lining 108 as is typical for a brake pad.

Referring to FIGS. 10A-10B, a brake pad 100h in accordance with yet another embodiment of the present invention can be seen. The brake pad 100h has a cutout 124 extending along the outer periphery of the backside 104h of the back plate 102h of the brake pad 100h.

The brake pad 100h has the cutout 124 extending along the outer periphery of the backside 104h of the back plate 102h and to the outer perimeter of the backside 104h of the back plate 102h so as to form a step extending along at least a majority of the outer periphery of the backside 104h of the back plate 102h, thus leaving a raised central platform 126 on the backside 104h of the back plate 102h. Accordingly, the cutout 124 is open both at the top and on one side that is coincident with the outer perimeter of the back plate 102h. The front side 106h of the back plate 102h is covered in large part by the friction lining 108 as is typical for a brake pad.

Referring to FIGS. 11A-11B, a brake pad 100i in accordance with yet another embodiment of the present invention can be seen. The brake pad 100i has a groove 128 extending in proximity to the outer periphery of the backside 104i of the back plate 102i of the brake pad 100i.

The brake pad 100i has the groove 128 extending substantially in parallel to and spaced apart from the outer perimeter of the backside 104i of the back plate 102i, while being in proximity to the outer perimeter of the backside 104i of the back plate 102i, for at least a majority of the outer periphery of the backside 104i of the back plate 102i. In the illustrative example of FIGS. 11A-11B, the groove 128 extends substantially in parallel to the outer perimeter of the backside 104i of the back plate 102i for essentially the entire outer periphery of the backside 104i of the back plate 102i. The front side 106i of the back plate 102i is covered in large part by the friction lining 108 as is typical for a brake pad.

Referring to FIG. 12, a brake pad 100j in accordance with yet another embodiment of the present invention can be seen. The brake pad 100j has an annular groove 130 provided in the backside 104j of the back plate 102j of the brake pad 100j.

The annular groove 130 corresponds approximately to the annular contact surface of the piston 206 in terms of its area and its inner and outer diameters. The front side 106j of the back plate 102j is covered in large part by the friction lining 108 as is typical for a brake pad.

Referring to FIG. 13, a brake pad 100k in accordance with yet another embodiment of the present invention can be seen. The brake pad 100k has a pattern of horizontal rows of X-shaped cavities 132 provided on the backside 104k of the back plate 102k of the brake pad 100k.

The brake pad 100k has the X-shaped cavities 132 provided in evenly spaced rows on the backside 104k of the back plate 102k of the brake pad. Each row of X-shaped cavities 132 extends along a line perpendicular to the central plane of symmetry of the brake pad 100k, which is perpendicular to the back plate 102e and passes through the middle of the brake pad and divides the brake pad into two symmetrical halves. The front side 106k of the back plate 102k is covered in large part by the friction lining 108 as is typical for a brake pad.

Figure 14A:
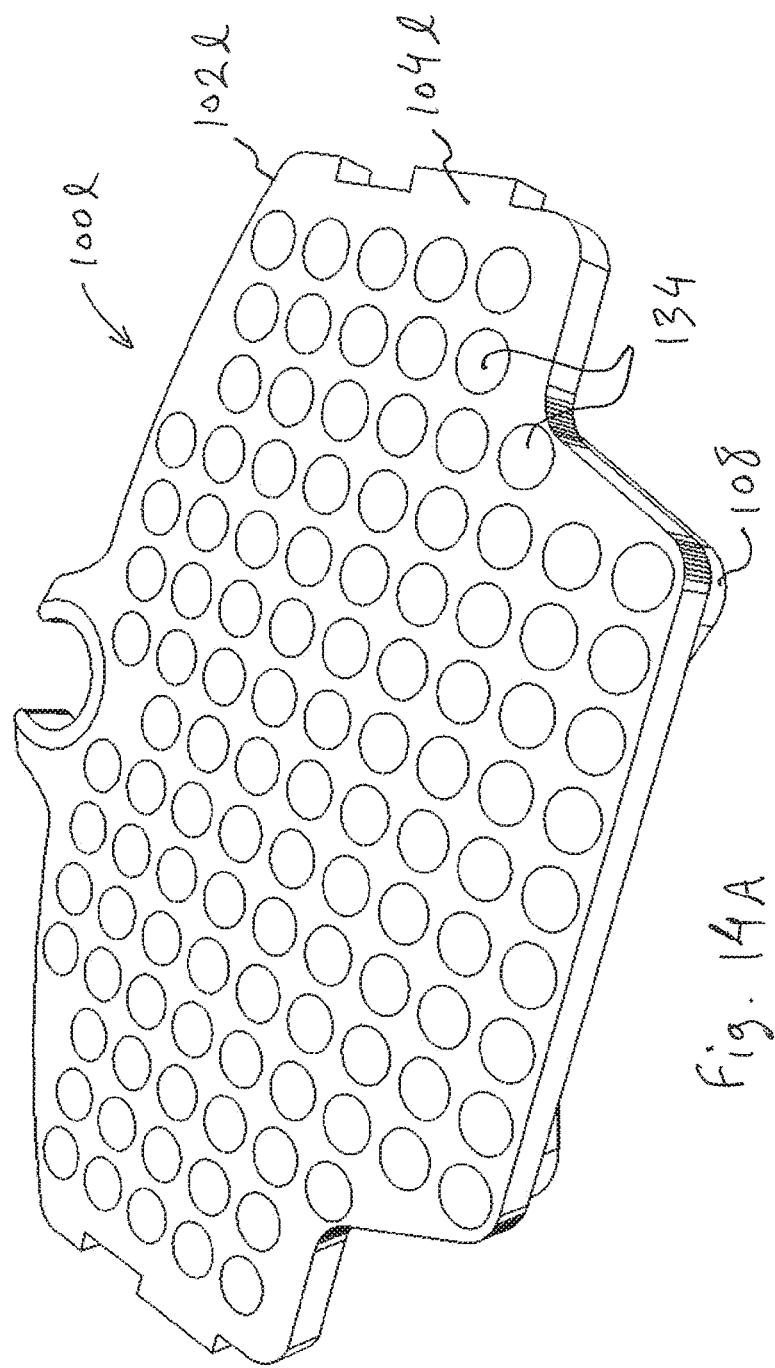

Referring to FIGS. 14A-14B, a brake pad 100l in accordance with yet another embodiment of the present invention can be seen. The brake pad 100l has a pattern of vertical rows of conical cavities 134 provided on the backside 104l of the back plate 102l of the brake pad 100l.

The brake pad 100l has the conical cavities 134 provided in evenly spaced rows on the backside 104l of the back plate 102l of the brake pad. Each row of conical cavities extends along a line parallel to the central plane of symmetry of the brake pad 100l, which is perpendicular to the back plate 102l and passes through the middle of the brake pad and divides the brake pad into two symmetrical halves. The front side 106l of the back plate 102l is covered in large part by the friction lining 108 as is typical for a brake pad.

FIGS. 15A-15B show a noise reducing shim or cover 136 that can be used with any of the brake pads disclosed above to achieve additional noise reduction. The shim 136 is made of sheet metal plate 138 that covers at least a majority of the backside of the back plate of the brake pad. The plate 138 is provided with resilient claws 140 for holding the shim 136 over the backside of the back plate of the brake pad. In the illustrated example, the shim 136 is used in conjunction with the brake pad 100*l*. In the illustrated example, the plate 138 is clad on both sides by layers of noise damping material 142. Examples of noise damping material include butyl-rubber and other types of rubber and plastic. The noise damping material layer 142 may be provided on only one side of the plate 138.

FIG. 16 is a cutaway view illustrating noise damping material for filling the cavities in the backside of the back plate of brake pads made in accordance with the present invention to further enhance noise reduction. The filling 144 is for the cylindrical cavities 118 and 120. The filling 146 is for the conical cavities 134. The filling 148 is for the X-shaped cavities 132. Examples of noise damping material include butyl-rubber and other types of rubber and plastic. In addition to noise damping material filling the cavities, the entire backside of the back plate of brake pads may be clad in a layer of noise damping material, which may be molded in one piece with the material filling the cavities.

Figure 19:
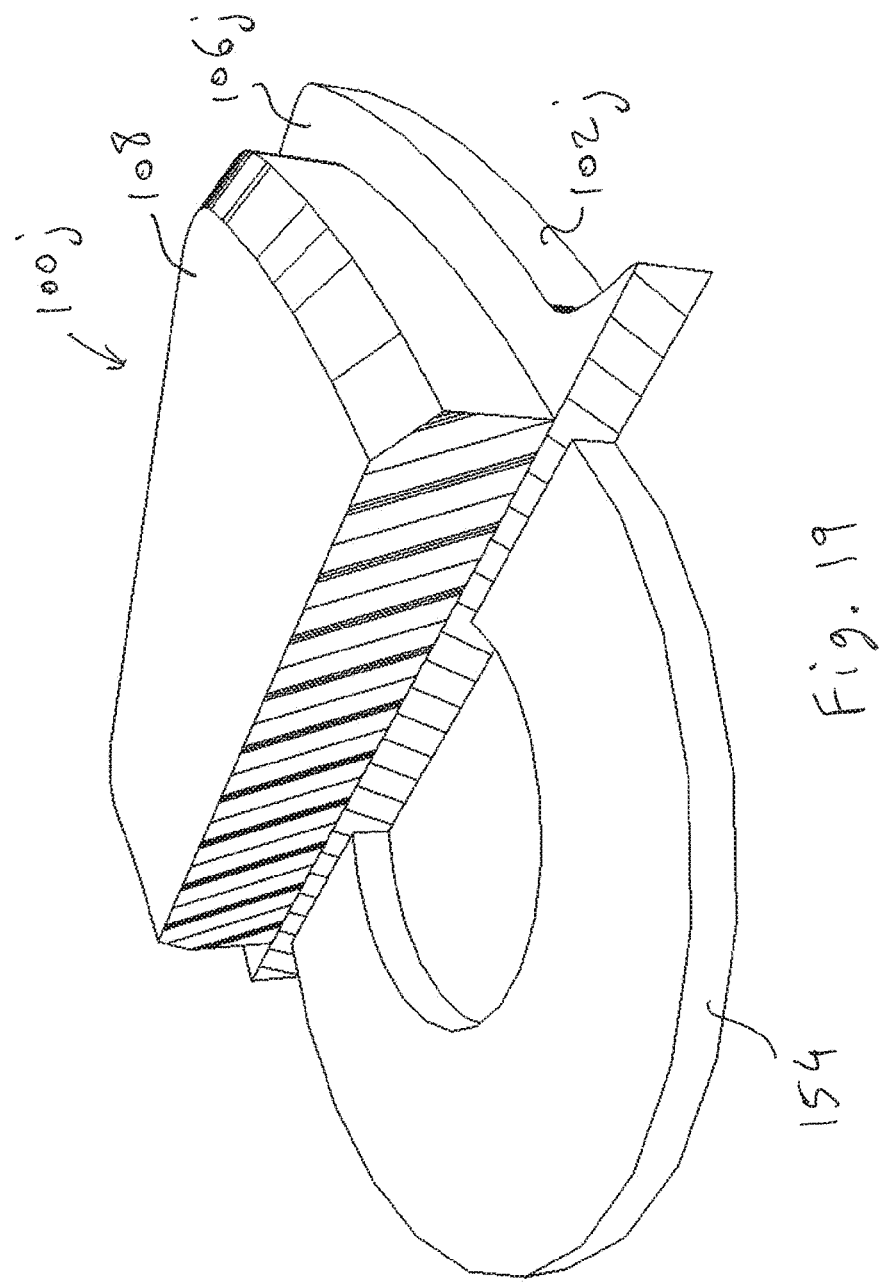
FIG. 19 is a cutaway view illustrating noise damping material filling the cavity in the backside of the back plate of a brake pad as illustrated in FIG. 12.

FIG. 17 is a cutaway view illustrating a noise damping material filling 150 for the groove 128 in the backside of the back plate of the brake pad 100*i* as illustrated in FIGS. 11A-11B. FIG. 18 is a cutaway view illustrating a noise damping material filling 152 for the cutout 124 in the backside of the back plate of the brake pad 100*h* as illustrated in FIGS. 10A-10B. FIG. 19 is a cutaway view illustrating a noise damping material filling 154 for the annular cavity 130 in the backside of the back plate of the brake pad 100*j* as illustrated in FIG. 12. Examples of noise damping material include butyl-rubber and other types of rubber and plastic. At present, butyl-rubber is the preferred noise damping material.

Figure 20:
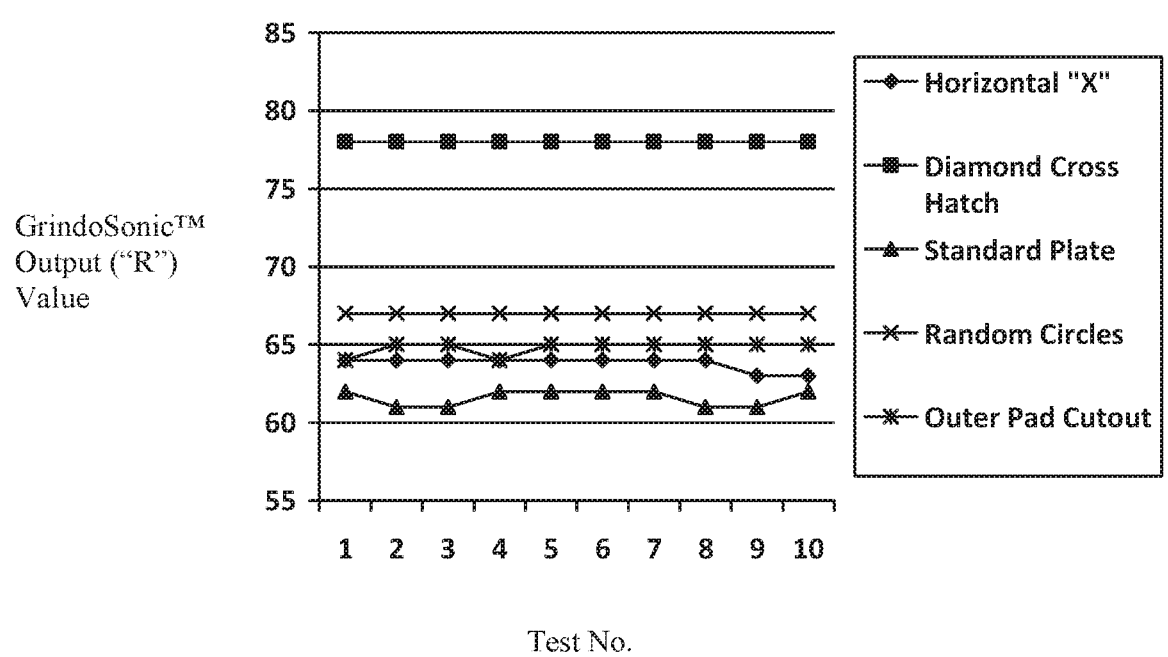
FIG. 20 is a plot of the ten data points for five of the sample brake pads tested.

FIG. 20 is a plot of the ten data points for five of the sample brake pads tested. FIG. 20 shows that every embodiment of the invention tested showed improved performance in terms of noise reduction in comparison to standard brake pads.

Other than the geometry of the indentations of cavities provided on the back sides of the brake pads, the brake pads 100*a* through 100*l* are essentially identical. The embodiments of the present invention that employ multiple individual cavities or indentations are provided with more than three cavities or indentations. In the illustrated examples of this type of noise reduction structure, the back surface of the back plate of the brake pad is provided with a dozen or more cavities or indentations. Cavities and indentations are used interchangeably in this description of the invention and in the appended claims.

The cavities or indentations provided on the back side of the backing plate of the brake pads of the present invention may be formed by machining the back side of the backing plate. However, for high volume and low cost manufacture methods such as embossing, coining, stamping, rolling, and press forming would be preferred. The brake pads according to the present invention provide good noise reduction.

Referring to FIG. 1, a disc brake system 200 using the brake pads of the present invention can be seen. The brake system 200 is of the floating caliper type. The brake pads of the present invention are equally well suited for use in disc brake systems of the fixed caliper type that employ hydraulically actuated pistons on both sides of the brake rotor 202. The brake system 200 includes a rotor or disc 202 that fits on the wheel hub and rotates with the wheel (not shown) of a vehicle. The caliper 204 is supported near the wheel hub such that it can position a brake pad, such as brake pads 100*a* through 100*l*, on either side of the rotor 202. The caliper is supported for limited movement in the direction of the axis of rotation of the wheel hub 212, hence the term "floating caliper." The caliper 204 has a piston cylinder 208 that houses a hydraulically actuated piston 206 for rectilinear to and fro movement in a direction parallel to the direction of the axis of rotation of the wheel hub 212. Hydraulic fluid under pressure is supplied to the cylinder 208 via hydraulic line 210 to effect braking. The brake pads are positioned such that their brake linings 108 frictionally engage the rotor 202 during braking. When the cylinder 208 is pressurized with hydraulic fluid, the piston 206 pushes one brake pad, e.g. the brake pad 100*a* on the right side of the caliper 204, against one side of the rotor 202 while the caliper 204 pulls the other brake pad into engagement with the other side of the rotor 202 such that the brake pads frictionally engage the rotor 202 on both sides and thereby brake and eventually stop the wheel.

The advantages of the brake pads in accordance with the present invention are as follows:
Structural damping to reduce noise
Lighter Weight
Greater friction thickness increasing pad life
Reduced failures
Less pedal travel creating a better pedal feel
Reduced cost Comparative Testing Samples of three standard brake pads, i.e. pads that are currently available commercially, were compared with several prototype brake pads made in accordance with the invention using the GrindoSonic™ MK4 acoustic testing apparatus using the "impulse excitation technique" in accordance with the instructions of the manufacturer of the apparatus. The test was conducted using the procedure described at the following website:

http://www.kraussgmbh.de/forum/viewtopic.php?f=18&t=115

During the test, a small elastic and non-destructive impulse or tap is applied to one part of the sample brake pad and a probe called a piezoelectric detector, measures the vibration that has traveled through the sample. Tapping is accomplished by a small tapping device or a hammer. The operator taps the sample and a reading appears on the screen in just a few seconds.

The reading on the screen of the GrindoSonic machine ("R") is equal to twice the period of the fundamental vibration of the part being tested expressed in microseconds. The frequency in Hz of the fundamental vibration can be obtained using the formula f=2,000,000/R. The numbers listed in the table of test results are the values for R obtained for each test of a sample brake pad being tested. The values of R have been found to positively correlate with noise damping such that the higher the value of R, the higher will be the amount of noise reduction.

Testing was done with the piezoelectric detector provided in the testing kit supplied with the GrindoSonic apparatus. The kit also contains various kinds of hammers for different applications. The larger the brake pads, the larger the hammer to be used for the excitation of the parts.

Test Results

The data Table below is the result of twelve tests performed on each sample type, with the highest and lowest numbers eliminated to minimize test variance. The first column describes the brake pad type tested, i.e. briefly describes the pattern that was formed in the back surface of the back plate of the brake pad, with the parts labeled "Production" or "Standard Plate," being the unaltered plates. Three production plates were tested to obtain an accurate average number. The graph in FIG. 20 plots the ten data points for five of the samples.

TABLE 1

Grindosonic ™ Evaluation - Embossed Back Plate vs. Standard Back Plate
GrindoSonic Output "R" Value (Data Eliminating One High and One Low Value)

| Brake Pad Type | Test 1 | Test 2 | Test 3 | Test 4 | Test 5 | Test 6 | Test 7 | Test 8 | Test 9 | Test 10 | Average |
|---|---|---|---|---|---|---|---|---|---|---|---|
| Horizontal "X" (FIG. 13) | 64 | 64 | 64 | 64 | 64 | 64 | 64 | 64 | 63 | 63 | 63.80 |
| Random "X" (FIG. 4) | 63 | 63 | 63 | 63 | 63 | 63 | 63 | 63 | 63 | 63 | 63.00 |
| Vertical "O" (FIGS. 14A-14B) | 64 | 65 | 62 | 63 | 64 | 63 | 63 | 64 | 63 | 64 | 63.50 |
| Random "O" (FIG. 5) | 63 | 63 | 63 | 63 | 63 | 63 | 63 | 63 | 63 | 63 | 63.00 |
| Diamond Cross Hatch (FIG. 6) | 78 | 78 | 78 | 78 | 78 | 78 | 78 | 78 | 78 | 78 | 78.00 |
| Production 1 | 62 | 62 | 61 | 62 | 62 | 61 | 61 | 62 | 63 | 61 | 61.70 |
| Production 2 | 62 | 61 | 61 | 62 | 62 | 62 | 62 | 61 | 61 | 62 | 61.60 |
| Production 3 | 62 | 62 | 62 | 61 | 62 | 61 | 62 | 62 | 62 | 61 | 61.70 |
| Right Angle Circles (FIG. 7) | 64 | 64 | 64 | 64 | 64 | 64 | 64 | 64 | 64 | 64 | 64.00 |
| Random Circles (FIG. 9) | 67 | 67 | 67 | 67 | 67 | 67 | 67 | 67 | 67 | 67 | 67.00 |
| Piston Cut Out (FIG. 12) | 65 | 65 | 65 | 65 | 65 | 65 | 65 | 65 | 65 | 65 | 65.00 |
| Outer Pad Cut Out (FIGS. 10A-10B) | 64 | 65 | 65 | 64 | 65 | 65 | 65 | 65 | 65 | 65 | 64.80 |

Referring to FIGS. 21-27, additional embodiments of the present invention can be seen. FIG. 21 illustrates a brake pad 100m in accordance with yet another embodiment of the present invention, which is a variation of the embodiment of FIG. 9. The brake pad 100m has a random pattern of cylindrical cavities 122m having circular cross sections provided on the backside 104m of the back plate 102m of the brake pad 100m. The cavities 122m are in the form of right circular cylinders at least up to their inner end portions.

The cylindrical cavities 122m are randomly distributed on the back side of the back plate of the brake pad 100m and are of an approximately uniform size, meaning that the cavities have approximately the same area in plan view and are approximately of the same depth. The front side 106m of the back plate 102m is covered in large part by the friction lining 108 as is typical for a brake pad. Referring to FIG. 25, a section through the back plate 102m shows examples of the various geometries that can be provided for the inner end portion of the cavities 122m, 122, 120, or 118. These example geometries include but are not limited to a planar or flat bottom 160, a domed or hemispherical bottom 161, a conical bottom 162, and a bottom 163 in the shape of a truncated cone that may also be referred to as a frusto-conical bottom. In one embodiment, the diameter of the cross section of the cavities 122n is approximately 0.1 inch. In another embodiment, the diameter of the cross section of the cavities 122n is approximately 0.2 inch. Preferably, the diameter of the cross section of the cavities 122n is in the range of from approximately 0.05 inch to approximately 0.25 inch. More preferably, the diameter of the cross section of the cavities 122n is in the range of from approximately 0.08 inch to approximately 0.12 inch.

The cavities in the back plates of the brake pads of the present invention can of course have cross sections other than circular. As an example, the cavities in the back plates of the brake pads of the present invention can have polygonal cross sections. FIG. 22 illustrates a brake pad 100n in accordance with yet another embodiment of the present invention. The brake pad 100n has a random pattern of cylindrical cavities 122n having square cross sections provided on the backside 104n of the back plate 102n of the brake pad 100n. Accordingly, the cavities 122n are in the form of parallelepipeds with square bases at least up to their inner end portions.

The cavities 122n are randomly distributed on the back side of the back plate of the brake pad 100n and are of an approximately uniform size, meaning that the cavities have approximately the same area in plan view and are approximately of the same depth. The front side 106n of the back plate 102n is covered in large part by the friction lining 108 as is typical for a brake pad. Referring to FIG. 25, a section through the back plate 102n shows examples of the various geometries that can be provided for the inner end portion of the cavities 122n. These example geometries include but are not limited to a planar or flat bottom 170, a domed bottom 171, a conical bottom 172, a bottom 174 in the shape of a pyramid having a square base, a bottom 175 in the shape of a truncated pyramid having a square base, and a bottom 173 in the shape of a truncated cone that may also be referred to as a frusto-conical bottom. In one embodiment, the length of the diagonal, i.e. the longest dimension, of the cross section of the cavities 122n is approximately 0.1 inch. In another embodiment, the longest dimension of the cross section of the cavities 122n is approximately 0.2 inch. Preferably, the length of the longest dimension of the cross section of the cavities 122n is in the range of from approximately 0.05 inch to approximately 0.25 inch. More preferably, the length of the longest dimension of the cross section of the cavities 122n is in the range of from approximately 0.08 inch to approximately 0.12 inch.

FIG. 23 illustrates a brake pad 100o in accordance with yet another embodiment of the present invention. The brake pad 100*o* has a random pattern of cylindrical cavities 122*o* having hexagonal cross sections provided on the backside 104*o* of the back plate 102*o* of the brake pad 100*o*. Accordingly, the cavities 122*o* are in the form of cylinders with hexagonal bases at least up to their inner end portions.

The cavities 122*o* are randomly distributed on the back side of the back plate of the brake pad 100*o* and are of an approximately uniform size, meaning that the cavities have approximately the same area in plan view and are approximately of the same depth. The front side 106*o* of the back plate 102*o* is covered in large part by the friction lining 108 as is typical for a brake pad. Referring to FIG. 26, a section through the back plate 102*o* shows examples of the various geometries that can be provided for the inner end portion of the cavities 122*o*. These example geometries include but are not limited to a planar or flat bottom 180, a domed bottom 181, a conical bottom 182, a bottom 184 in the shape of a pyramid having a hexagonal base, a bottom 185 in the shape of a truncated pyramid having a hexagonal base, and a bottom 183 in the shape of a truncated cone that may also be referred to as a frusto-conical bottom. In one embodiment, the length of the longest dimension of the cross section of the cavities 122*o* is approximately 0.1 inch. In another embodiment, the longest dimension of the cross section of the cavities 122*o* is approximately 0.2 inch. Preferably, the length of the longest dimension of the cross section of the cavities 122*o* is in the range of from approximately 0.05 inch to approximately 0.25 inch. More preferably, the length of the longest dimension of the cross section of the cavities 122*o* is in the range of from approximately 0.08 inch to approximately 0.12 inch.

FIG. 24 illustrates a brake pad 100*p* in accordance with yet another embodiment of the present invention. The brake pad 100*p* has a random pattern of cylindrical cavities 122*p* having octagonal cross sections provided on the backside 104*p* of the back plate 102*p* of the brake pad 100*p*. Accordingly, the cavities 122*p* are in the form of cylinders with octagonal bases at least up to their inner end portions.

The cavities 122*p* are randomly distributed on the back side of the back plate of the brake pad 100*p* and are of an approximately uniform size, meaning that the cavities have approximately the same area in plan view and are approximately of the same depth. The front side 106*p* of the back plate 102*p* is covered in large part by the friction lining 108 as is typical for a brake pad. Referring to FIG. 26, a section through the back plate 102*p* shows examples of the various geometries that can be provided for the inner end portion of the cavities 122*p*. These example geometries include but are not limited to a planar or flat bottom 190, a domed bottom 191, a conical bottom 192, a bottom 194 in the shape of a pyramid having a octagonal base, a bottom 195 in the shape of a truncated pyramid having a octagonal base, and a bottom 193 in the shape of a truncated cone that may also be referred to as a frusto-conical bottom. In one embodiment, the length of the longest dimension of the cross section of the cavities 122*p* is approximately 0.1 inch. In another embodiment, the longest dimension of the cross section of the cavities 122*p* is approximately 0.2 inch. Preferably, the length of the longest dimension of the cross section of the cavities 122*p* is in the range of from approximately 0.05 inch to approximately 0.25 inch. More preferably, the length of the longest dimension of the cross section of the cavities 122*p* is in the range of from approximately 0.08 inch to approximately 0.12 inch.

In some embodiments of the brake pad of the present invention, the cavities may extend through the entire thickness of the back plate of the brake pad. For example, in the embodiments of FIGS. 4, 5, 7, 8, 9, 13, 14A, 14B, 15A, 15B, 16, and 21-27, the cavities in the back side of the back plate of the brake pad may be extended through the entire thickness of the back plate of the brake pad without jeopardizing the integrity of the back plate of the brake pad. Referring to FIG. 27, examples of cavities that extend through the entire thickness of the back plate 102*m* of the brake pad can be seen. The cavity 300 is formed by a cylindrical hole that extends through at least the entire thickness of the back plate 102*m*. The cavity 300 can be formed by any suitable process including those enumerated herein. The friction lining 108 covers over the opening formed by the cavity 300 in the front face 106*m* of the back plate 102*m* in areas where the front face or front side 106*m* of the back plate 102*m* is covered by the friction lining 108. The cavity 302 is formed by a cylindrical hole that extends at least through the entire thickness of the back plate 102*m* and terminates in a raised projection 304 on the front face 106*m* of the back plate 102*m*. The end of the cavity 302 proximate the front face 106*m* of the back plate 102*m* is closed such that it does not form an opening on the front face 106*m* of the back plate 102*m*. The projection 304 may be formed prior to the formation of the cavity 302 by any suitable process such as, for example, embossing. The cavity 302 is then formed to extend into the projection 304 by any suitable process including those enumerated herein. Alternatively, the projection 304 may be formed during the formation of the cavity 302. For example, the projection 304 may be pushed outward from the front face 106*m* of the back plate 102*m* by a punch, may be even in cooperation with a die, being used to form the cavity 302. A production brake pad would be provided with a plurality of cavities 302 and corresponding projections 304 in essentially in the same manner as disclosed herein in relation to the cavities 122*m* among others. The projections 304 are covered by and embedded in the friction lining 108 in the areas of the front face 106*m* of the back plate 102*m* that are covered by the friction lining 108. The projections 304 aid in retaining the friction lining 108 on the front face 106*m* of the back plate 102*m*. Accordingly, each of the projections 304 forms a retention enhancing feature.

The cavity 306 is formed by a cylindrical hole that extends at least through the entire thickness of the back plate 102*m* and terminates in a raised projection 308 on the front face 106*m* of the back plate 102*m*. The end of the cavity 306 proximate the front face 106*m* of the back plate 102*m* is closed such that it does not form an opening on the front face 106*m* of the back plate 102*m*. The projection 308 may be formed prior to the formation of the cavity 306 by any suitable process such as, for example, embossing. The cavity 306 is then formed to extend into the projection 308 by any suitable process including those enumerated herein. Alternatively, the projection 308 may be formed during the formation of the cavity 306 as discussed previously with respect to the cavity 302 and the projection 304. The outward terminus or end of the projection 308 is provided with a retention enhancing feature such as the enlargement 310 illustrated in FIG. 27. In the illustrated embodiment, the enlargement is in the form of an enlarged head 310. The head 310 is dimensionally enlarged in a direction transverse to the longitudinal axis of the cavity 306. In the illustrated example, the head 310 forms a radially extending flange. A production brake pad would be provided with a plurality of cavities 306 and corresponding projections 308 in essentially in the same manner as disclosed herein in relation to the cavities 122*m* among others. The projections 308 are covered by and embedded in the friction lining 108 in the areas of the front face 106*m* of the back plate 102*m* that are covered by the friction lining 108. The projections 308 aid in retaining the friction lining 108 on the front face 106*m* of the back plate 102*m*. The enlargements 310 of the projections 308 further enhance the retention of the friction lining 108 on the front face 106*m* of the back plate 102*m*.

The cavity 312 is formed by a cylindrical hole that extends at least through the entire thickness of the back plate 102*m* and terminates in a raised projection 314 on the front face 106*m* of the back plate 102*m*. The end of the cavity 312 proximate the front face 106*m* of the back plate 102*m* is open such that it forms an opening on the front face 106*m* of the back plate 102*m*. The projection 314 may be formed prior to the formation of the cavity 312 by any suitable process such as, for example, embossing. The cavity 312 is then formed to extend into and completely through the projection 314 by any suitable process including those enumerated herein. Alternatively, the projection 314 may be formed during the formation of the cavity 312. For example, the projection 314 may be pushed outward from the front face 106*m* of the back plate 102*m* by a punch, may be even in cooperation with a die, being used to form the cavity 312 with the punch driven completely through the projection 314 and perforating the projection 314. A production brake pad would be provided with a plurality of cavities 312 and corresponding projections 314 in essentially the same manner as disclosed herein in relation to the cavities 122*m* among others. The projections 314 are covered by and embedded in the friction lining 108 in the areas of the front face 106*m* of the back plate 102*m* that are covered by the friction lining 108. The projections 314 aid in retaining the friction lining 108 on the front face 106*m* of the back plate 102*m*. Accordingly, each of the projections 314 forms a retention enhancing feature. The retention of the friction lining 108 on the front face 106*m* of the back plate 102*m* may be further enhanced by some material from the friction lining 108 entering and occupying at least a portion of the bore of the projection 314.

The cavity 316 is formed by a cylindrical hole that extends at least through the entire thickness of the back plate 102*m* and terminates in a raised projection 318 on the front face 106*m* of the back plate 102*m*. The end of the cavity 316 proximate the front face 106*m* of the back plate 102*m* is open such that it forms an opening on the front face 106*m* of the back plate 102*m*. The projection 318 may be formed prior to the formation of the cavity 316 by any suitable process such as, for example, embossing. The cavity 316 is then formed to extend into and completely through the projection 318 by any suitable process including those enumerated herein. Alternatively, the projection 318 may be formed during the formation of the cavity 316 as discussed previously with respect to the cavity 312 and the projection 314. The outward terminus or end of the projection 318 is provided with a retention enhancing feature such as the enlargement 320 illustrated in FIG. 27. In the illustrated embodiment, the enlargement is in the form of an enlarged head 320. The head 320 is dimensionally enlarged in a direction transverse to the longitudinal axis of the cavity 316. In the illustrated example, the head 320 forms a radially extending flange. A production brake pad would be provided with a plurality of cavities 316 and corresponding projections 318 in essentially in the same manner as disclosed herein in relation to the cavities 122*m* among others. The projections 318 are covered by and embedded in the friction lining 108 in the areas of the front face 106*m* of the back plate 102*m* that are covered by the friction lining 108. The projections 318 aid in retaining the friction lining 108 on the front face 106*m* of the back plate 102*m*. The enlargements 320 of the projections 318 further enhance the retention of the friction lining 108 on the front face 106*m* of the back plate 102*m*. The retention of the friction lining 108 on the front face 106*m* of the back plate 102*m* may be further enhanced by some material from the friction lining 108 entering and occupying at least a portion of the bore of the projection 318.

The enlargements 310 and 320 may be formed by upsetting the ends of projections 308 and 314, respectively, in, for example, a coining, heading, or flaring operation. Simply driving a punch through the entire thickness of the back plate in order to perforate the back plate may cause the material of the back plate to flare out in one or more petal-like projections to form a retention-enhancing feature on the front face 106*m* of the back plate 102*m*.

In the embodiments of FIGS. 4, 5, 7, 8, 9, 13, 14A, 14B, 15A, 15B, 16, and 21-26, the depth of the cavities can range from as little as 0.003 inch to approximately 0.210 inch. More preferably, the cavities have depths within a range from approximately 0.015 inch to approximately 0.210 inch. Even more preferably, the cavities have depths within a range from approximately 0.05 inch to approximately 0.210 inch. Yet more preferably, the cavities have depths within a range from approximately 0.06 inch to approximately 0.18 inch. In some preferred embodiments, the depth of the cavities is at least approximately 0.06 inch. In other preferred embodiments, the depth of the cavities is at least approximately 0.12 inch. In yet other preferred embodiments, the depth of the cavities is at least approximately 0.18 inch. In one preferred embodiment, the depth of the cavities is approximately 0.06 inch. In another preferred embodiment, the depth of the cavities is approximately 0.12 inch. In yet another preferred embodiment, the depth of the cavities is approximately 0.18 inch.

The back plates of the embodiments of FIGS. 4, 5, 7, 8, 9, 13, 14A, 14B, 15A, 15B, 16, and 21-27 are provided with at least approximately two cavities per square inch. More preferably, the back plates of these embodiments are provided with at least approximately four cavities per square inch. Even more preferably, the back plates of these embodiments are provided with at least approximately six cavities per square inch. Yet more preferably, the back plates of these embodiments are provided with at least approximately twelve cavities per square inch. Yet even more preferably, the back plates of these embodiments are provided with at least approximately twenty four cavities per square inch. Still more preferably, the back plates of these embodiments are provided with at least approximately thirty six cavities per square inch. The cavities referred to above are distributed over at least a majority of the area of the back side of the back plate of the brake pad at the given density. The thickness of the back plate as used herein does not include the height of the projections 304, 308, 314, and 318 formed on the front side of the back plate.

The various cavities and their bottom geometries can be created by any suitable means including but not limited to drilling, stamping, punching, die cutting, machining, rolling, pressing, coining, or embossing. For example, the cavities 122*m* having conical bottoms 162 can be formed by drilling as well as other suitable processes. As another example, the cavities 122*m* having flat bottoms 160 can be formed by machining with an end mill as well as other suitable processes.

Vehicle and laboratory testing has been carried out to validate the effectiveness of brake pads according to present invention in reducing brake noise. During testing experimental brake pads with different back plate configurations were made using a friction material for the lining 108 that was known to produce noise. The experimental brake pads were then tested to evaluate how the different back plate configurations impacted the frequency of noisy vehicle stops. The evaluation consisted of 67 days of vehicle tests with approximately 160 miles a day. The final results showed that some brake pads with configurations according to the present invention reduced the frequency of noisy stops to 0.6% of all stops. Some brake pads according to the present invention produced less noise than all the configurations tested, including the OEM products with insulator.

Vehicle Testing Results

Individual Test Descriptions and Discussion:

1. Test number one was conducted using a standard backplate with no slots, no chamfers, and no insulator. The friction material was a material known to create an undesirable noise (NEM) and the results were that it produced noise 31% of the time.

Figure 28B:
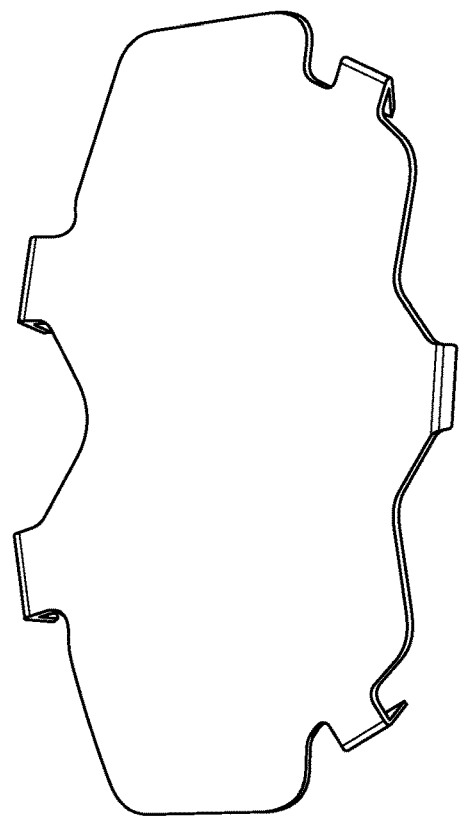
FIGS. 28A-28B show the inside and the outside of a DRT shim, respectively.
Figure 28A:
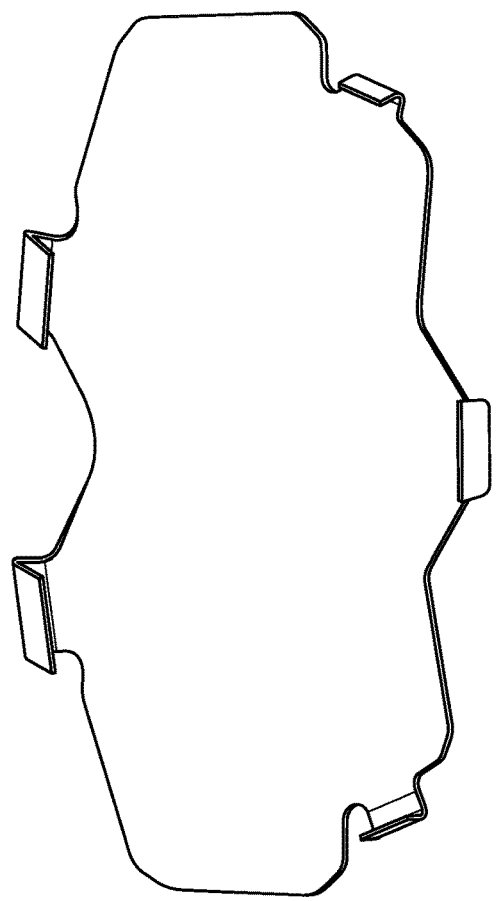

2. Test number 2 was conducted using the same material, rotor, and configuration as test number one, but with the addition of a diamond rubber shim (see FIGS. 28A-28B). The results were approximately the same as test Number one, with noise created 31.5% of the time.

3. Test number 3 was conducted using the same configuration and friction material as in test numbers one and two, but adding a single slot to the friction lining. This resulted in a significant improvement with noise on 18.7% of the stops.

4. Test number four used the same material as in tests one, two, and three, but with the addition of a chamfer on the edge of the braking face of the friction lining. This configuration created noise 28.3% of the time.

5. Test number 5 was conducted using the same NEM as the previous tests. The pad had no slot, chamfer, or shim, but had circular cavities in the back side of the back plate the cavities had diameters of 0.200 inch and depths of 0.06 inch (VDS 200-60). This configuration produced noisy stops 35.9% of the time.

6. Test number six was the same as test number five, except the rotors were changed and the test repeated. Noisy stops occurred 35.0% of the time.

7. Test number seven was conducted the same as test number six, but with a DRT shim. The results were similar, with noise being created 36.7% of the time.

8. Test number eight was conducted with no slot, no chamfer, and no shim, but the back plate had cavities with diameters of 0.100 inch and depths of 0.06 inch. The smaller diameter holes reduced the noise production by a third when compared to the larger diameter holes. Noisy stops occurred 20.4% of the time.

9. Test number nine was the same as test number eight, but with the addition of the DRT shim. The results were similar with noisy stops occurring approximately 20.3% of the time, indicating that the DRT shim is not an effective noise canceling media.

Figure 29B:
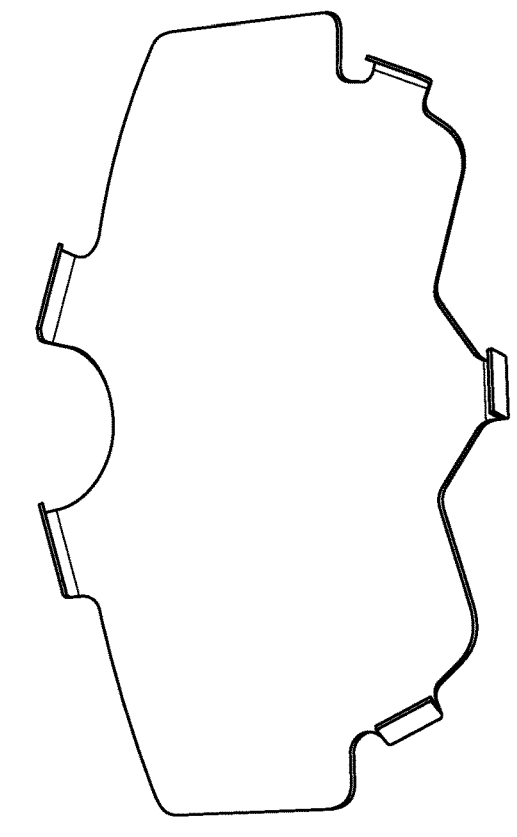
FIGS. 29A-29B show the inside and the outside of a Wolverine shim, respectively.
Figure 29A:
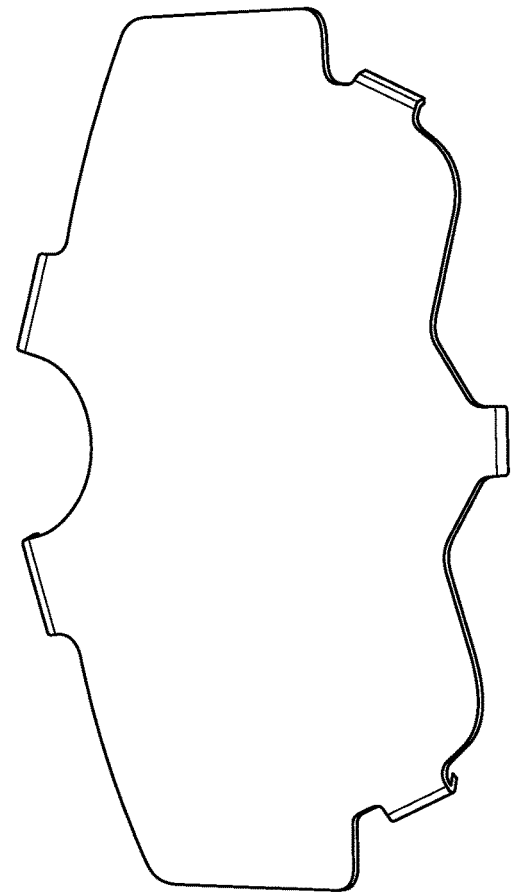
Figure 30B:
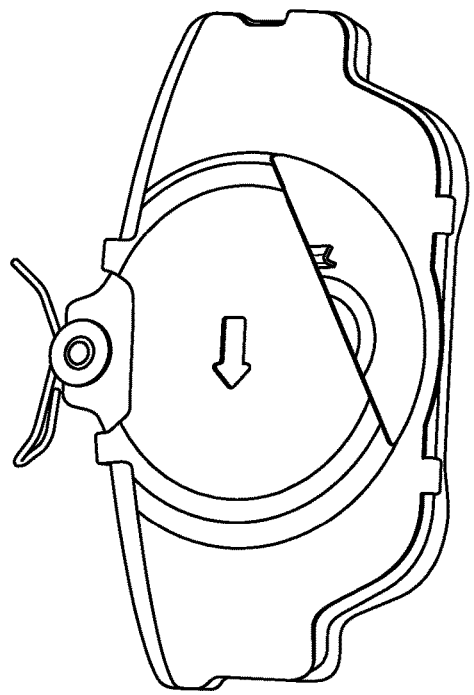
FIGS. 30A-30D show outboard and inboard pads and shims from OEM manufacturer.
Figure 30D:
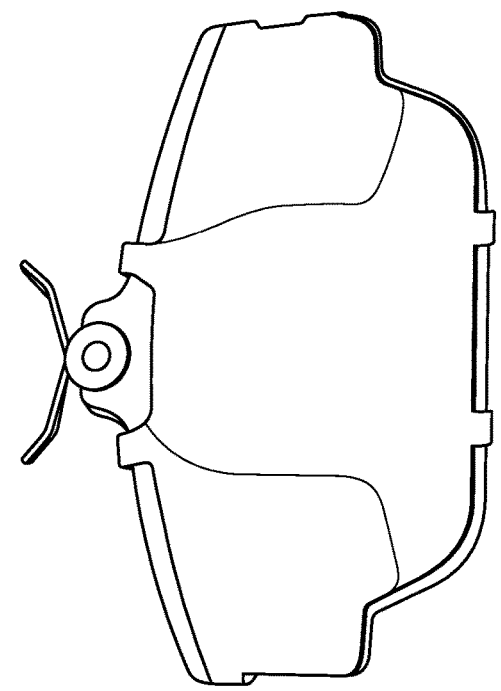
Figure 30A:
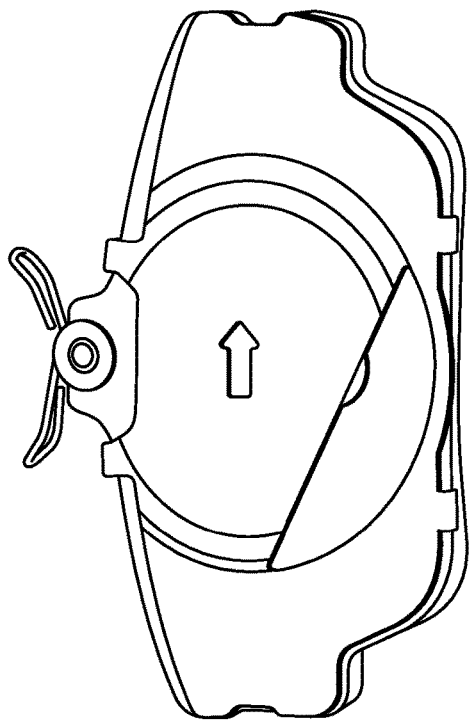
Figure 30C:
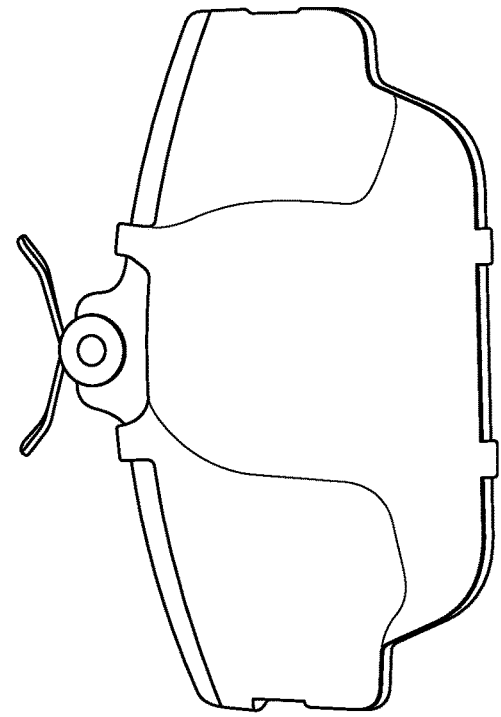
Figure 31B:
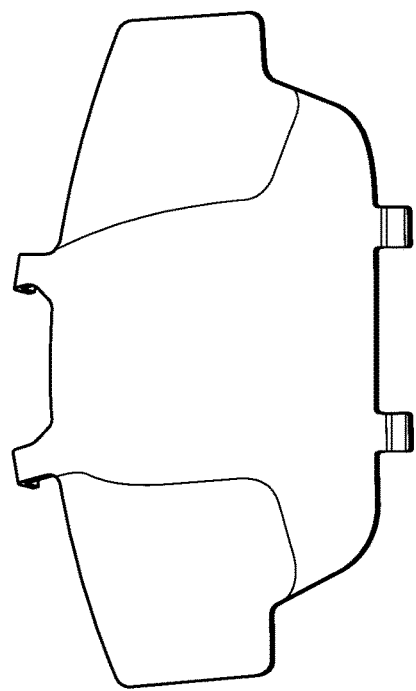
FIGS. 31A-31D show outboard and inboard shims for OEM manufactured pads.
Figure 31D:
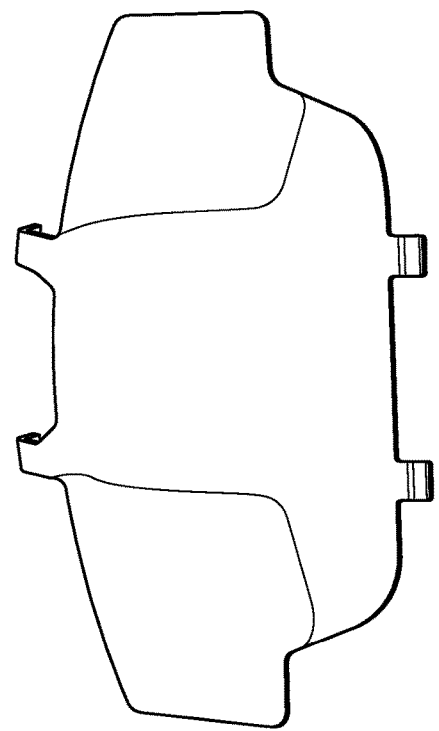
Figure 31A:
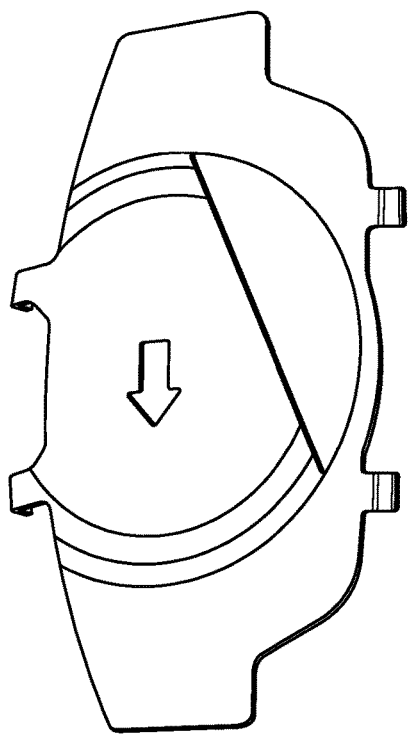
Figure 31C:
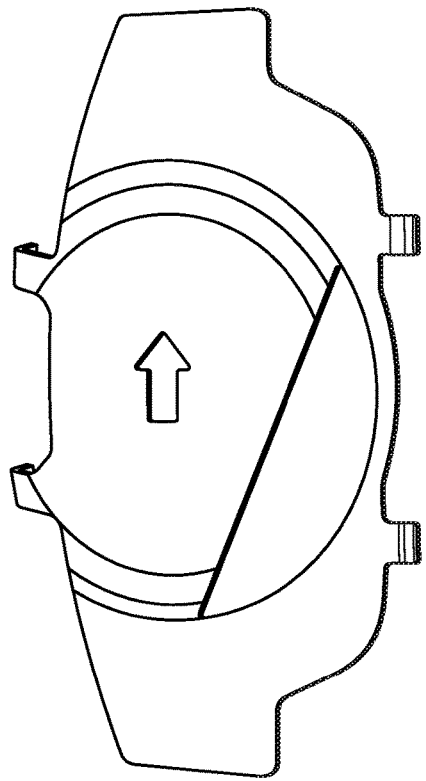

10. Test number ten was the same as test numbers eight and nine, but with a wolverine shim (see FIGS. 29A-29B). This improved the noise occurrence considerably, down to 9.7%.

11. Test number eleven was the most effective of all, by producing noise only 0.6% of the time. The test was conducted with the NEM material, no slot, no chamfer, no insulator, but the back plate had cavities with diameters of 0.100 inch and depths of 0.18 inch (VDS 100-180).

12. Conditions for test number twelve were the same as for test number eleven, but with new rotors, and noise was only produced 7.0% of the time.

13. Conditions for test number thirteen were the same as for test numbers eleven and twelve, but with the addition of a wolverine shim. The results were favorable, and noise was only produced 1.3% of the time.

14. Test number fourteen was conducted with a back plate having cavities with diameters of 0.100 inch and depths of 0.08 inch (VDS 100-80), a slot and chamfer in the friction lining, and no shim. The pad was made of a low warranty production material, and noise was produced 36.7% of the time.

15. Test number fifteen was conducted in a similar manner as test number fourteen, but the back plate of the brake pad had cavities with diameters of 0.100 inch and depths of 0.12 inch (VDS 100-120). This resulted in noisy stops being produced only 15.4% of the time.

16. Test number sixteen used the same setup as test number fifteen, but the back plate of the brake pad had cavities with diameters of 0.100 inch and depths of 0.18 inch (VDS 100-180). The results were that noise was produced 9.0% of the time.

17. Test number seventeen was conducted using the low-warranty friction material, a slot and chamfer in the friction lining, a standard backplate, and a wolverine shim, which produced noise 1.8% of the time.

18. Test number eighteen was an OEM configuration, with OEM rotors and OEM shims, and noise was produced 8% of the time.

Terminology Used in the Test Descriptions Above:

1. NEM: Noise Emitting Material known to produce a level 7 to 9 level noise under braking.

2. FM 2: Low-warranty production material.

3. DRT: Diamond Rubber shim from Advance (Meneta).

4. VDS 200-60: Back plate modified with round holes of 0.200 inch diameter and 0.06 inch depth, located randomly along back plate with a density of 12 holes per square inch.

5. VDS 100-80: Back plate modified with round holes of 0.100 inch diameter and 0.080 inch depth, located randomly along back plate with a density of 36 holes per square inch.

6. VDS 100-120: Back plate modified with round holes of 0.100 inch diameter and 0.120 inch depth, located randomly along back plate with a density of 36 holes per square inch.

7. VDS 100-180: Back plate modified with round holes of 0.100 inch diameter and 0.180 inch depth, located randomly along back plate with a density of 36 holes per square inch.

8. NUCW: NuCap Shim with Wolverine Material.

9. Ford OEM: Advics SLEPM9283FF (FIGS. 30A-30D and FIGS. 31A-31D).

Scanning Laser Vibrometer Testing

Objective

The objective of this test was to characterize four Brake Pads for frequency response and deflection shapes using OMS Corporation's LaserScan LS01 scanning laser vibrometer.

Test Plan

Four brake pads were used for characterization. These pads represent variations in design features and/or materials.

Pad 1: VDS 100/080
Pad 2: Prod Unmodified
Pad 3: VDS 200/060
Pad 4: VDS 100/180

Testing was conducted on both the front and back plate of each pad.

Test Equipment

The following equipment was used during the project:

TABLE 2

| Make | Model | Description | Serial Number | Calibration Due |
|---|---|---|---|---|
| OMS Corporation | LaserScan LS01 | Scanning Laser Vibrometer | 730005 | Jan. 5, 2016 |
| Pyramid | PA1000x | Power Amplifier | N/A | N/A |
| Agilent | 33220A | Arbitrary Waveform Generator | MY43000120 | N/A |
| Bruel & Kjaer | 4810 | Shaker | 2716685 | N/A |
| Endevco | 256HX-100 | Accelerometer | 12361 | Reference |

Test Method

The OMS LaserScan LS01 scanning laser vibrometer was used as the response transducer and data acquisition system for all measurements performed during this project. The test specimens were scanned at multiple locations sequentially. The LS01 system measured and recorded the vibration response of the pad at multiple locations as a result of the artificial excitation source. An accelerometer was positioned on the corner of the brake pad as a reference signal for the closed loop operation of the scanning laser vibrometer. The weight of the accelerometer (1 oz) was less than 1% of the weight of each pad (15.9 oz) and its mass loading effects where considered negligible on the response of the pads. Frequency response measurements of the brake pad with and without accelerometer confirm the negligibility of the accelerometer mass.

Test Data

TABLE 3

| | Front | | | |
|---|---|---|---|---|
| Frequency | Unmodified | VDS 100-080 | VDS 200-060 | VDS 100-180 |
| 1000 | 2.77E−06 | 2.04E−06 | 4.20E−07 | 3.92E−06 |
| 2000 | 8.71E−06 | 1.12E−05 | 1.13E−05 | 1.49E−05 |
| 3000 | 1.13E−05 | 1.87E−05 | 1.64E−05 | 1.53E−05 |
| 4000 | 3.70E−05 | 2.89E−05 | 5.01E−05 | 1.90E−05 |
| 5000 | 3.85E−06 | 6.26E−06 | 6.10E−06 | 8.61E−06 |
| 6000 | 2.32E−06 | 6.73E−06 | 1.14E−05 | 2.39E−07 |
| 7000 | 2.28E−06 | 4.97E−06 | 2.64E−06 | 6.76E−06 |
| 8000 | 9.17E−06 | 1.71E−05 | 1.17E−05 | 8.25E−07 |
| 9000 | 5.26E−05 | 8.86E−05 | 3.21E−05 | 4.09E−05 |
| 10000 | 5.16E−05 | 2.41E−05 | 3.71E−05 | 1.24E−05 |
| 11000 | 1.67E−05 | 1.84E−05 | 9.65E−06 | 4.60E−06 |
| 12000 | 8.91E−06 | 7.67E−06 | 5.63E−06 | 8.30E−06 |
| 13000 | 4.54E−06 | 8.07E−06 | 1.30E−05 | 9.25E−06 |
| 14000 | 1.81E−06 | 8.17E−06 | 4.11E−06 | 1.25E−06 |
| 15000 | 1.80E−06 | 4.51E−06 | 2.56E−06 | 9.24E−06 |
| 16000 | 1.64E−06 | 4.38E−06 | 4.77E−06 | 7.72E−06 |
| 17000 | 3.40E−06 | 4.82E−06 | 1.03E−05 | 2.47E−06 |
| 18000 | 4.07E−06 | 5.13E−06 | 2.30E−06 | 2.29E−06 |
| 19000 | 8.53E−06 | 5.83E−06 | 8.96E−06 | 9.43E−06 |
| 20000 | 7.08E−06 | 9.98E−06 | 9.42E−06 | 1.96E−06 |

TABLE 4

| | Back Plate | | | |
|---|---|---|---|---|
| Frequency | Unmodified | VDS 100-080 | VDS 200-060 | VDS 100-180 |
| 1000 | 1.55E−06 | 8.81E−07 | 2.57E−06 | 1.46E−06 |
| 2000 | 1.35E−05 | 1.43E−05 | 1.19E−05 | 1.25E−05 |
| 3000 | 2.06E−05 | 2.03E−05 | 1.47E−05 | 1.71E−05 |
| 4000 | 1.17E−05 | 1.66E−05 | 7.78E−06 | 4.02E−06 |
| 5000 | 7.83E−06 | 5.08E−06 | 1.21E−05 | 5.28E−06 |
| 6000 | 9.65E−06 | 6.64E−07 | 1.47E−05 | 9.45E−06 |
| 7000 | 3.27E−05 | 1.90E−05 | 4.95E−05 | 3.52E−05 |
| 8000 | 1.92E−05 | 1.24E−05 | 2.86E−05 | 2.73E−05 |
| 9000 | 1.30E−05 | 1.70E−05 | 1.34E−05 | 2.86E−05 |
| 10000 | 3.10E−06 | 6.27E−06 | 3.67E−06 | 2.00E−06 |
| 11000 | 6.79E−06 | 3.63E−06 | 4.91E−06 | 7.61E−06 |
| 12000 | 4.73E−06 | 4.87E−06 | 3.73E−06 | 3.91E−06 |
| 13000 | 1.22E−06 | 3.51E−06 | 6.04E−06 | 3.00E−06 |
| 14000 | 4.18E−06 | 7.77E−06 | 6.17E−06 | 9.24E−07 |
| 15000 | 3.09E−06 | 2.98E−06 | 4.85E−06 | 3.40E−06 |
| 16000 | 3.61E−06 | 3.46E−06 | 6.42E−06 | 1.85E−06 |
| 17000 | 4.58E−06 | 2.73E−06 | 1.20E−06 | 1.76E−06 |
| 18000 | 9.40E−07 | 4.80E−06 | 5.21E−06 | 4.34E−06 |
| 19000 | 6.16E−06 | 8.96E−06 | 4.42E−06 | 1.69E−06 |
| 20000 | 5.89E−06 | 4.94E−06 | 2.61E−06 | 3.15E−06 |

Summary of Vibrometer Testing

Various manufacturing features of material removal from back plate shifted resonances of the brake pads.

It is to be understood that the present invention is not limited to the embodiments described above, but encompasses any and all embodiments within the scope of the following claims.

The invention claimed is:

1. Method of reducing brake noise comprising the steps of:
   providing a brake pad consisting of:
   a backing plate having a front side and a back side; and
   a brake lining provided on said front side of said backing plate said front side having no indentations or protrusions;
   providing a random pattern of indentations or cavities provided on said back side of said backing plate to reduce noise when braking with a brake system employing the brake pad; and
   installing the brake pad in a brake system without the use of separate insulators or shims.

2. The method of claim 1, wherein said cavities are formed by a process selected from the group consisting of machining, embossing, coining, stamping, rolling, and press forming.

3. The method of claim 1, wherein said cavities are formed by a process selected from the group consisting of embossing, coining, stamping, rolling, and press forming.

4. The method of claim 1, wherein said cavities are formed by a plurality of randomly distributed cavities.

5. The method of claim 2, wherein said cavities are formed by a plurality of randomly distributed cavities.

* * * * *